US010357911B2

(12) United States Patent
Schad et al.

(10) Patent No.: US 10,357,911 B2
(45) Date of Patent: Jul. 23, 2019

(54) COOLING PLATE ASSEMBLY FOR AN INJECTION MOLDING MACHINE

(71) Applicant: Niigon Machines Ltd., Vaughan (CA)

(72) Inventors: Robert D. Schad, Toronto (CA); Roberto Sicilia, Mississauga (CA)

(73) Assignee: NIIGON MACHINES LTD., Vaughan (CA)

( * ) Notice: Subject to any disclaimer, the term of this patent is extended or adjusted under 35 U.S.C. 154(b) by 195 days.

(21) Appl. No.: 15/247,349

(22) Filed: Aug. 25, 2016

(65) Prior Publication Data

US 2017/0057140 A1 Mar. 2, 2017

Related U.S. Application Data

(60) Provisional application No. 62/209,861, filed on Aug. 25, 2015, provisional application No. 62/279,906, filed on Jan. 18, 2016.

(51) Int. Cl.
*B29C 45/43* (2006.01)
*B29D 22/00* (2006.01)
(Continued)

(52) U.S. Cl.
CPC .......... *B29C 45/43* (2013.01); *B29C 45/7207* (2013.01); *B29D 22/003* (2013.01); *B29C 45/4225* (2013.01); *B29C 2045/4233* (2013.01); *B29C 2045/7214* (2013.01); *B29C 2045/7221* (2013.01); *B29K 2105/253* (2013.01)

(58) Field of Classification Search
CPC ............ B29C 45/43; B29C 2045/7214; B29C 47/7207; B29C 45/4225; B29C 2045/7221; B29C 2045/4233; B29D 22/003
See application file for complete search history.

(56) References Cited

U.S. PATENT DOCUMENTS 4,304,542 A * 12/1981 Sauer .................... B29C 49/221
264/511
5,368,468 A * 11/1994 Boskovic ............ B29C 45/4005
264/335
(Continued)

FOREIGN PATENT DOCUMENTS

| JP | H1148324 A | 2/1999 |
| KR | 20110112032 A | 10/2011 |
| WO | 0024562 A1 | 5/2000 |

*Primary Examiner* — Joseph S Del Sole
*Assistant Examiner* — Emmanuel S Luk
(74) *Attorney, Agent, or Firm* — Bereskin & Parr LLP/S.E.N.C.R.L.,S.R.L.

(57) ABSTRACT

A cooling plate assembly includes (a) a cooling plate having a plate front surface; (b) an air channel extending within a thickness of the cooling plate; (c) a plate bore extending into the cooling plate from the plate front surface for providing fluid communication between the air channel and a cavity of a cooling tube mountable to the cooling plate; and (d) a valve within the plate bore. The valve is movable between a first position in which a first air flow passage extending within the plate bore is open for conducting air from the cavity to the air channel, and a second position in which the first air flow passage is obstructed to reduce air flow between the cavity and the air channel, and in which a second air flow passage extending within the plate bore is open for conducting air from the air channel to the cavity.

24 Claims, 15 Drawing Sheets

(51) Int. Cl.
 *B29C 45/72* (2006.01)
 *B29C 45/42* (2006.01)
 *B29K 105/00* (2006.01)

(56) References Cited

U.S. PATENT DOCUMENTS

| | | | |
|---|---|---|---|
| 5,447,426 A * | 9/1995 | Gessner | B29C 45/4225 249/68 |
| 6,164,955 A * | 12/2000 | Kubota | B29C 45/263 425/437 |
| 6,190,157 B1 | 2/2001 | Hofstetter | |
| 6,443,421 B1 * | 9/2002 | Wolfe | B29C 45/43 251/323 |
| 7,156,647 B2 * | 1/2007 | Zoppas | B29C 45/7207 264/336 |
| 7,252,497 B2 | 8/2007 | Neter | |
| 7,264,464 B2 * | 9/2007 | Unterlander | B29C 45/7207 425/445 |
| 7,293,980 B2 * | 11/2007 | Neter | B29C 45/7207 425/526 |
| 7,326,046 B2 * | 2/2008 | Neter | B29C 45/7207 264/237 |
| 7,473,093 B1 * | 1/2009 | Lachmansingh | B29C 45/4225 264/571 |
| 7,670,126 B2 | 3/2010 | McCready | |
| 8,585,394 B2 * | 11/2013 | Thoemmes | B29C 45/7207 425/526 |
| 2003/0203063 A1 * | 10/2003 | Ano | B29C 45/43 425/117 |
| 2003/0206984 A1 * | 11/2003 | Bellasalma | B29C 33/46 425/130 |
| 2004/0247734 A1 * | 12/2004 | Unterlander | B29C 45/7207 425/528 |
| 2006/0204605 A1 * | 9/2006 | Neter | B29C 45/7207 425/526 |
| 2006/0204607 A1 * | 9/2006 | Neter | B29C 45/7207 425/547 |
| 2006/0204608 A1 * | 9/2006 | Neter | B29C 35/16 425/547 |
| 2007/0264384 A1 * | 11/2007 | McCready | B29C 45/4225 425/533 |
| 2007/0264385 A1 | 11/2007 | McCready | |
| 2008/0089972 A1 * | 4/2008 | Ansari | B29C 45/4225 425/445 |

* cited by examiner

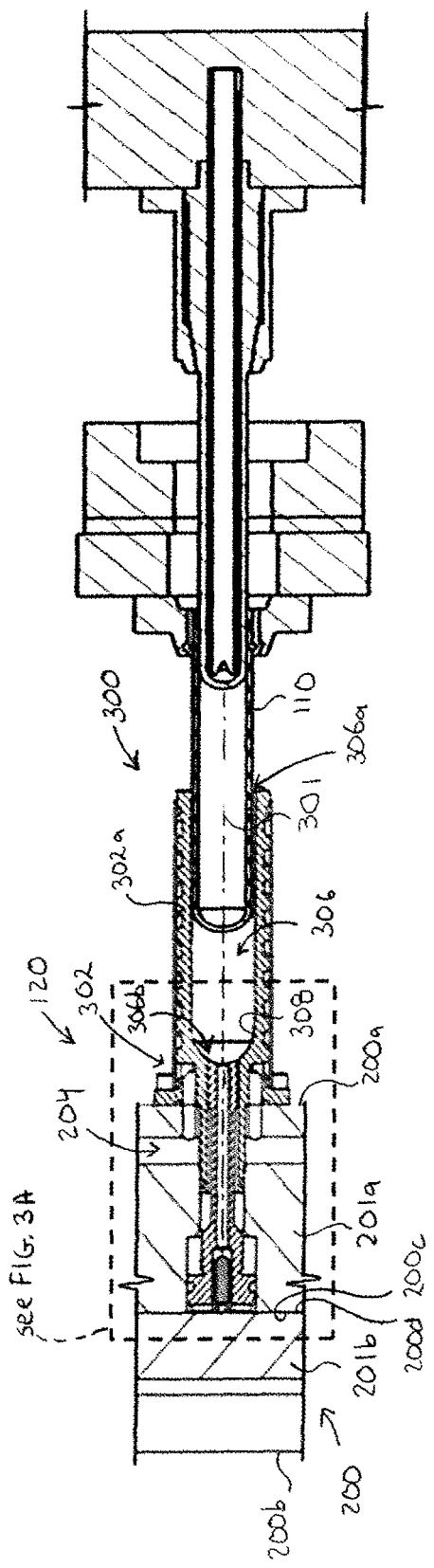
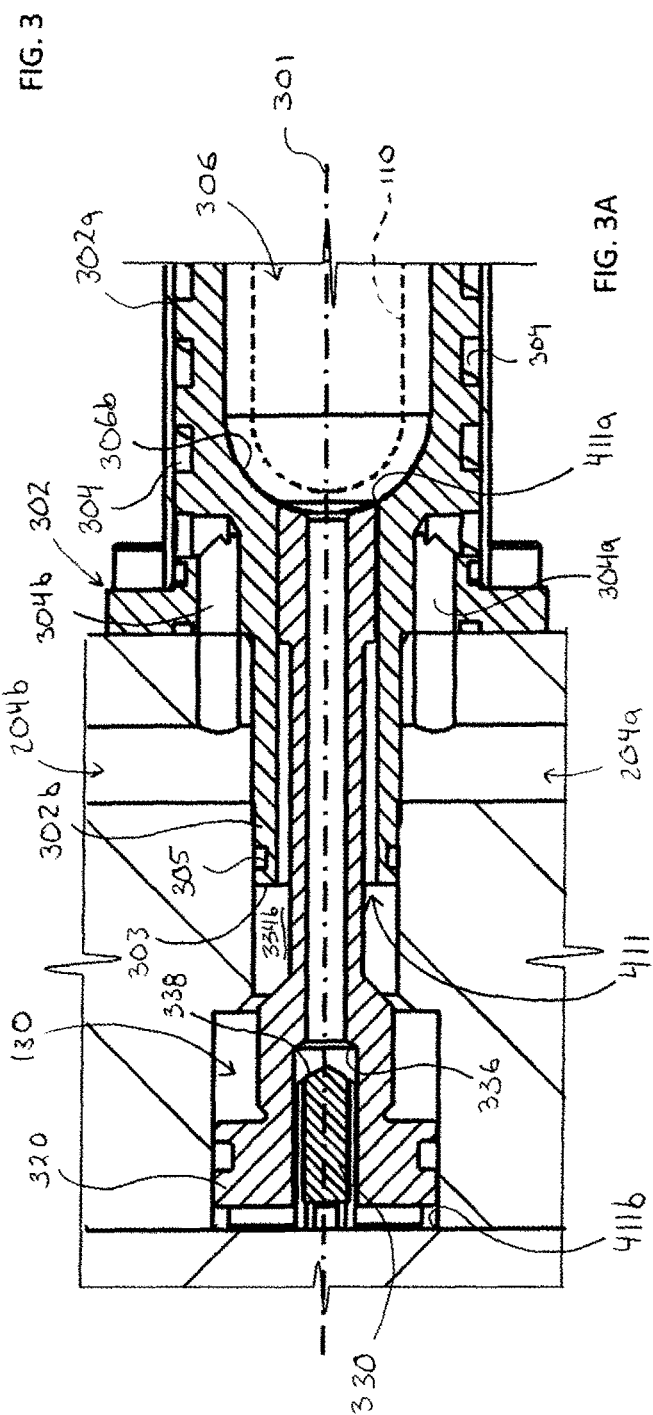
FIG. 3
FIG. 3A

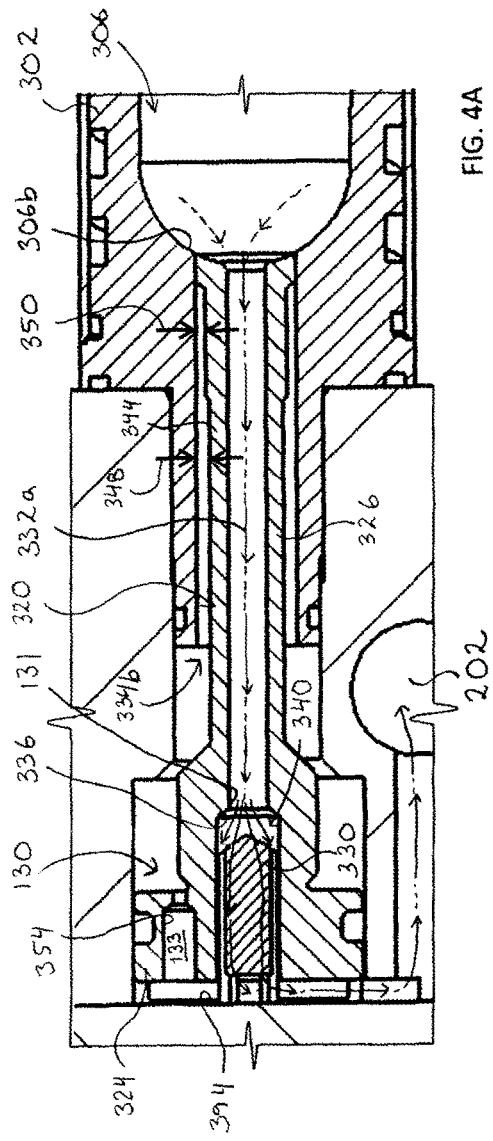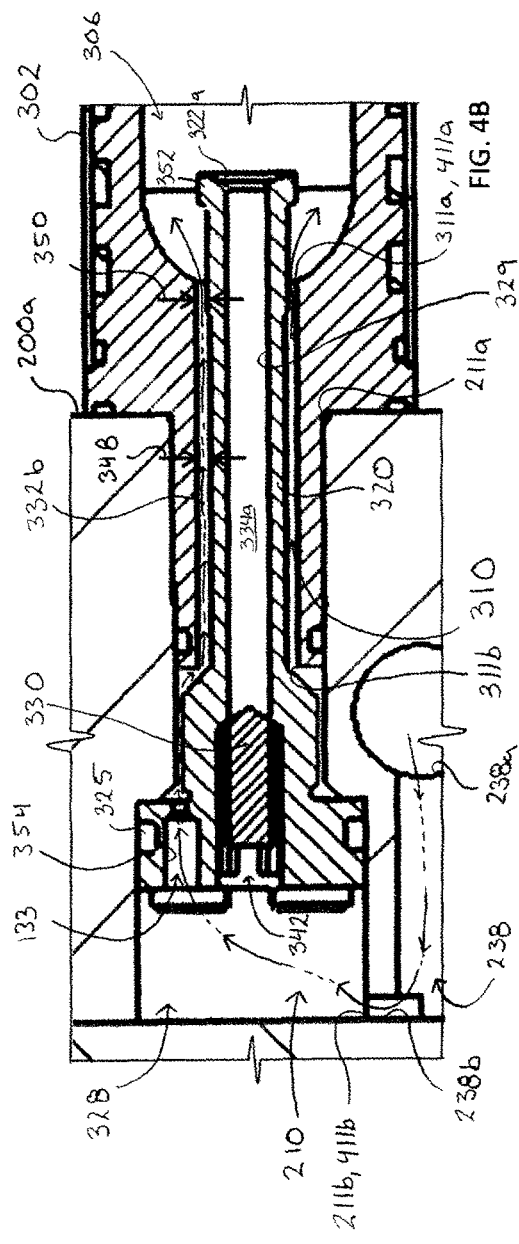

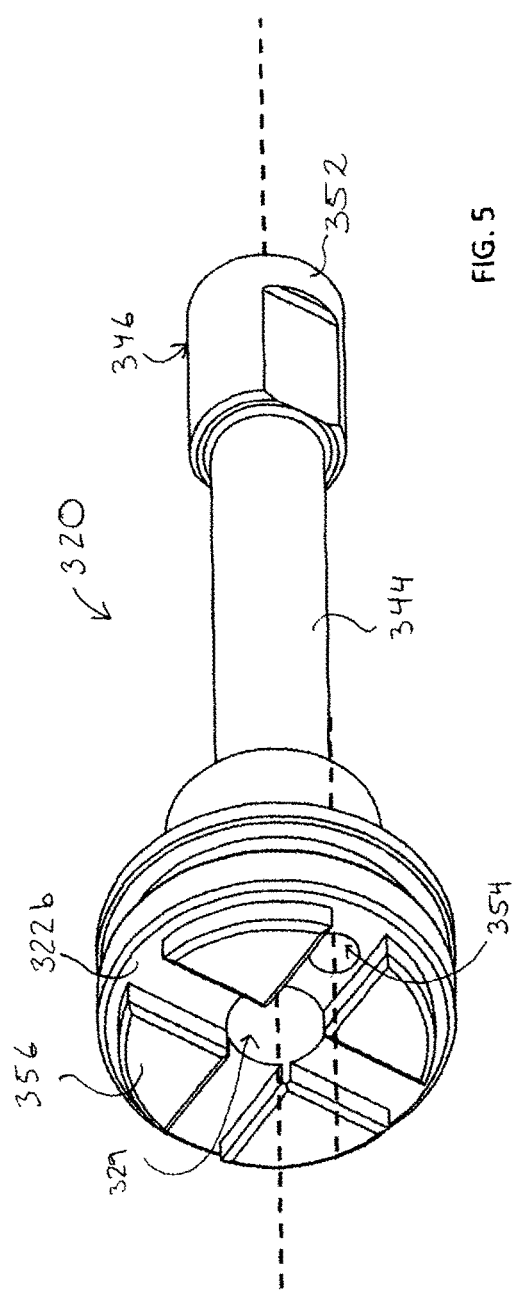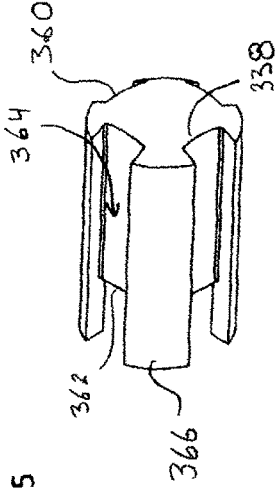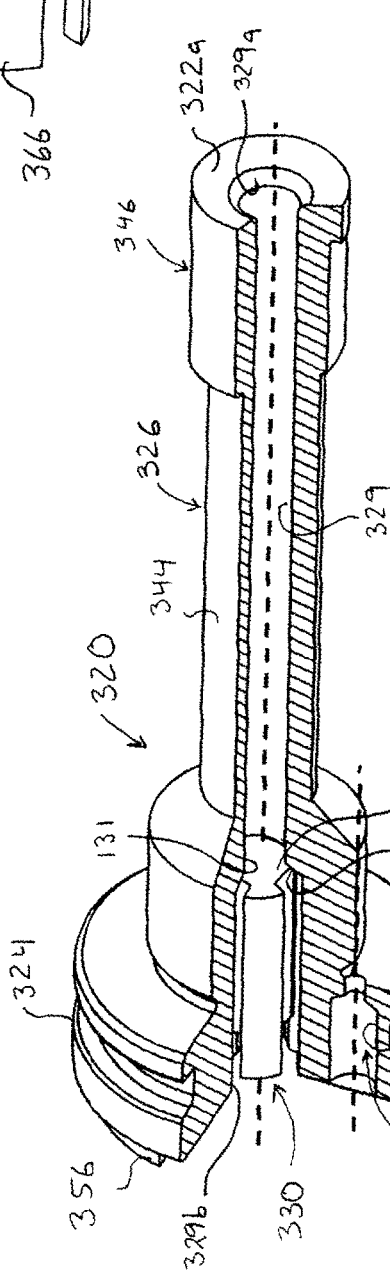

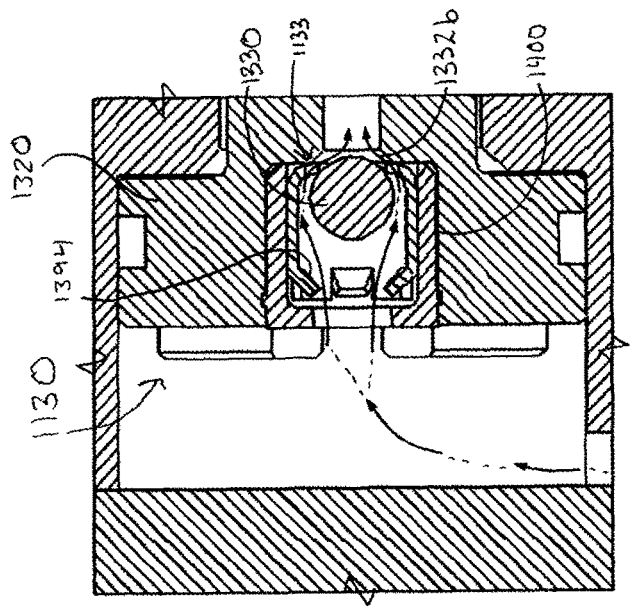
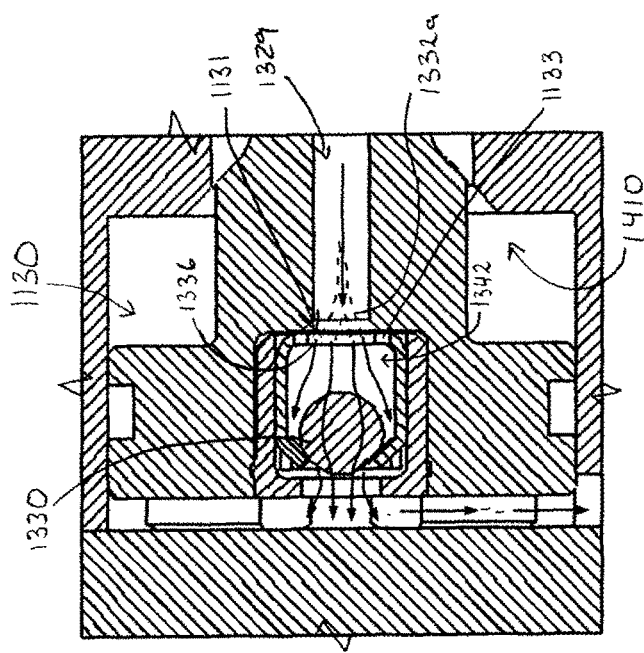
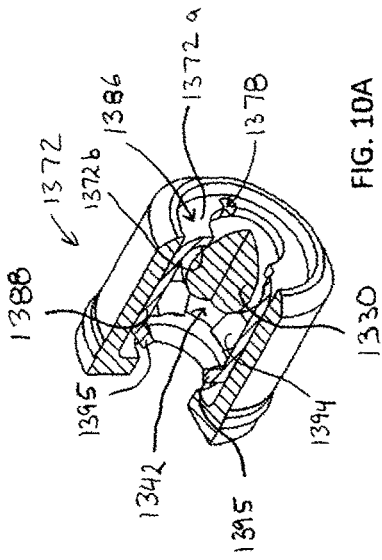
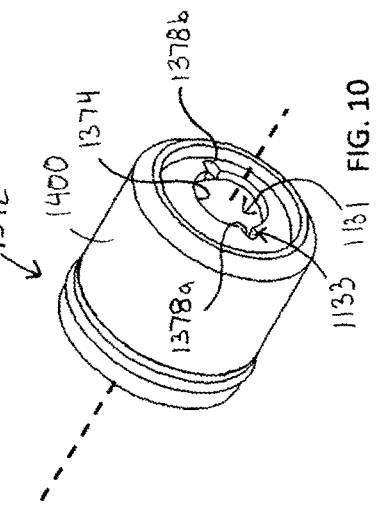
FIG. 9B
FIG. 10A
FIG. 9A
FIG. 10

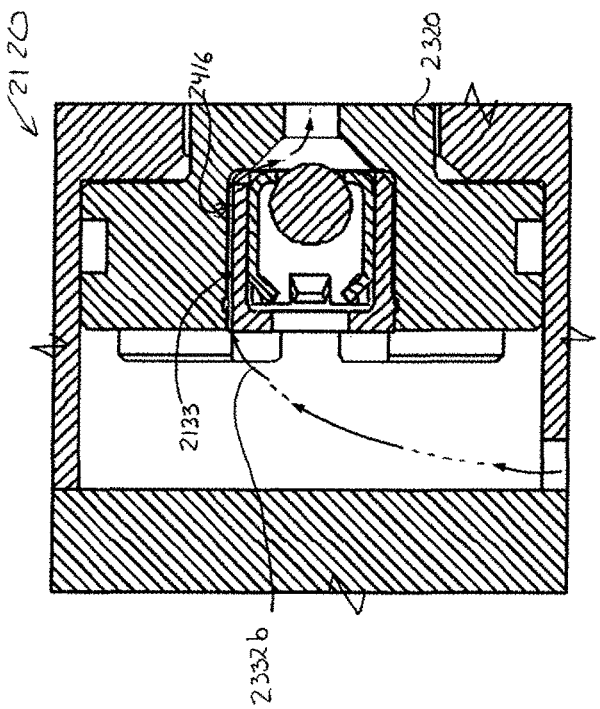
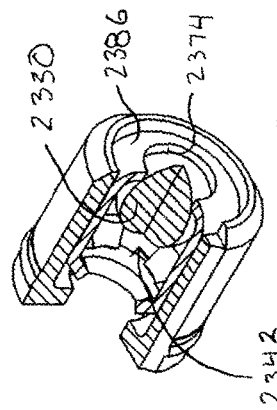
FIG. 11A
FIG. 12
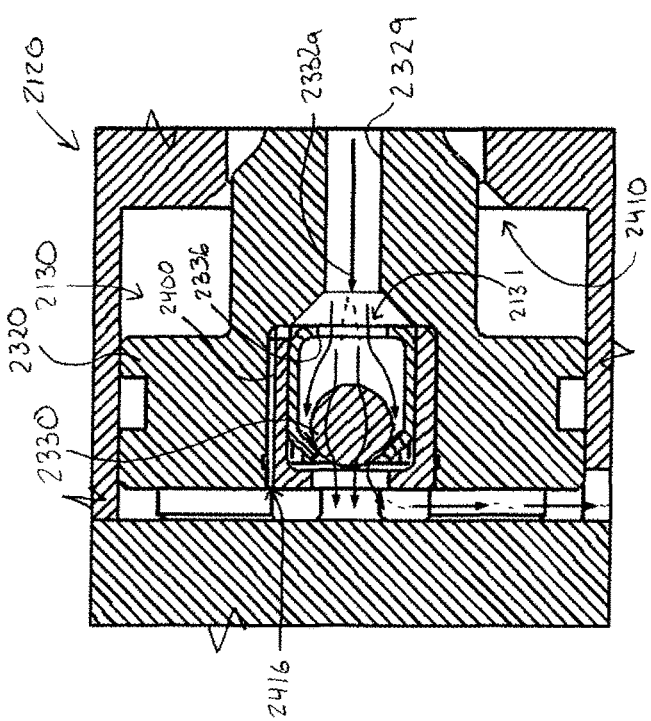
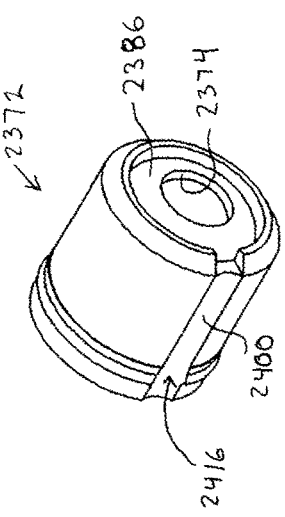
FIG. 11B
FIG. 12A

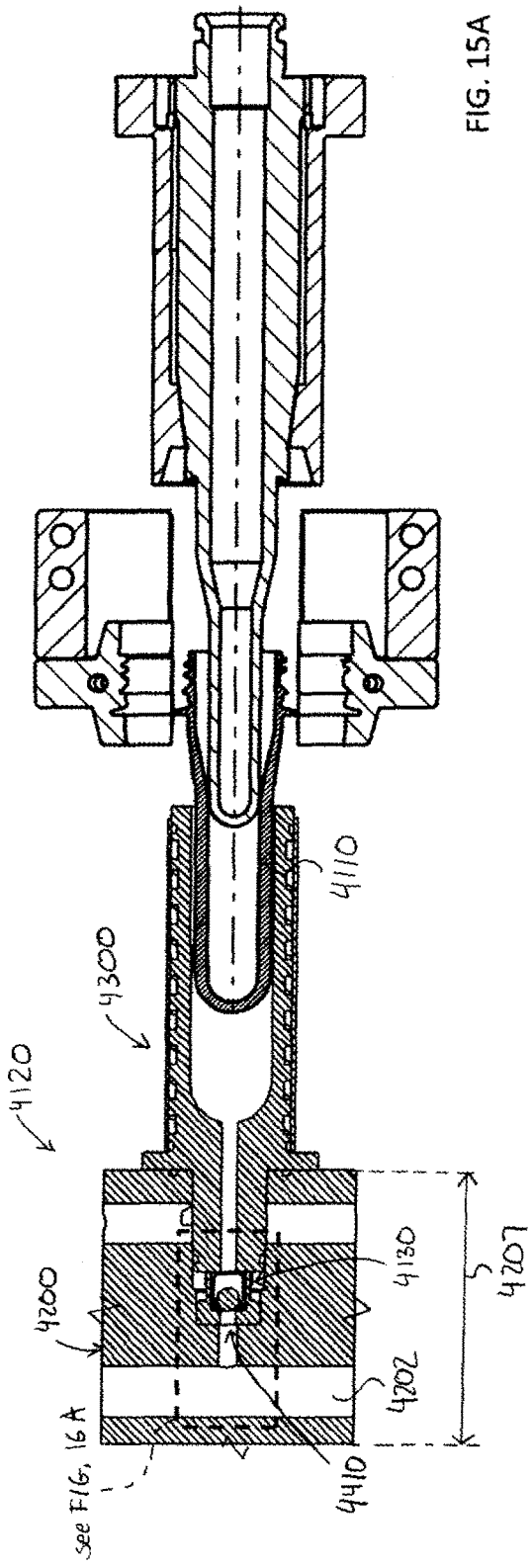
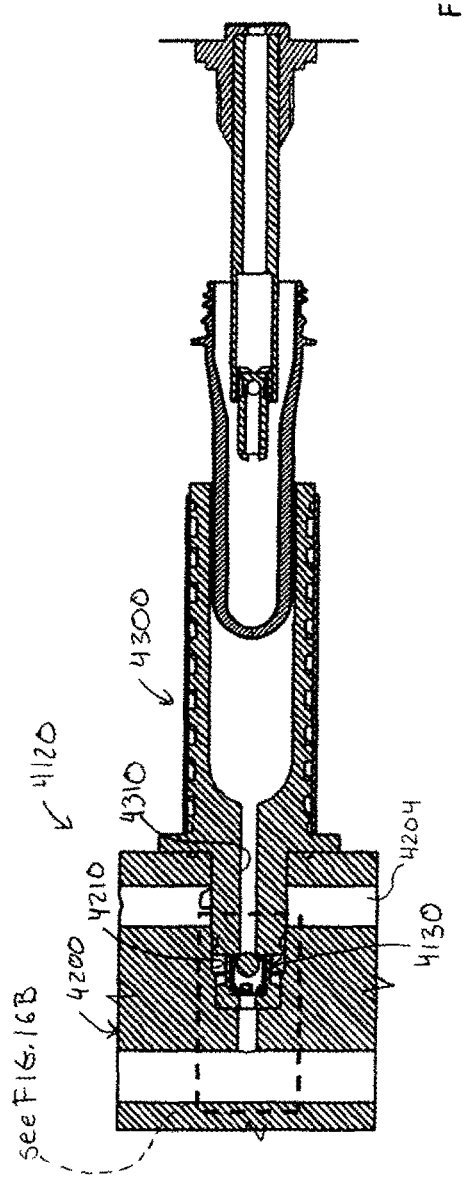
FIG. 15A
FIG. 15B

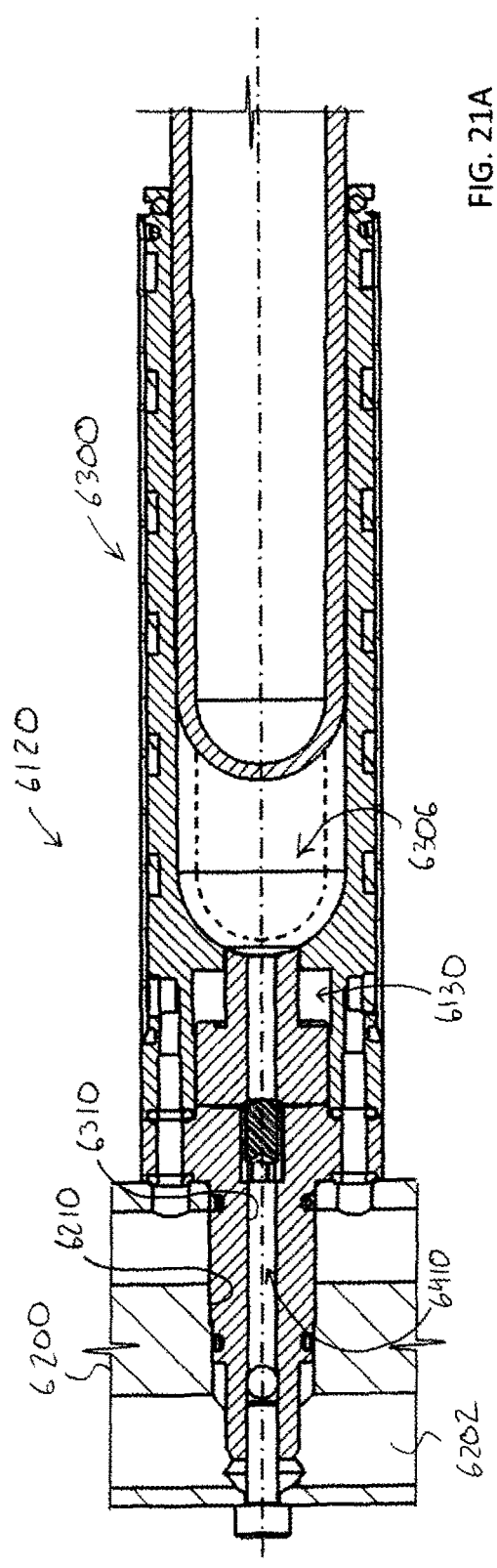
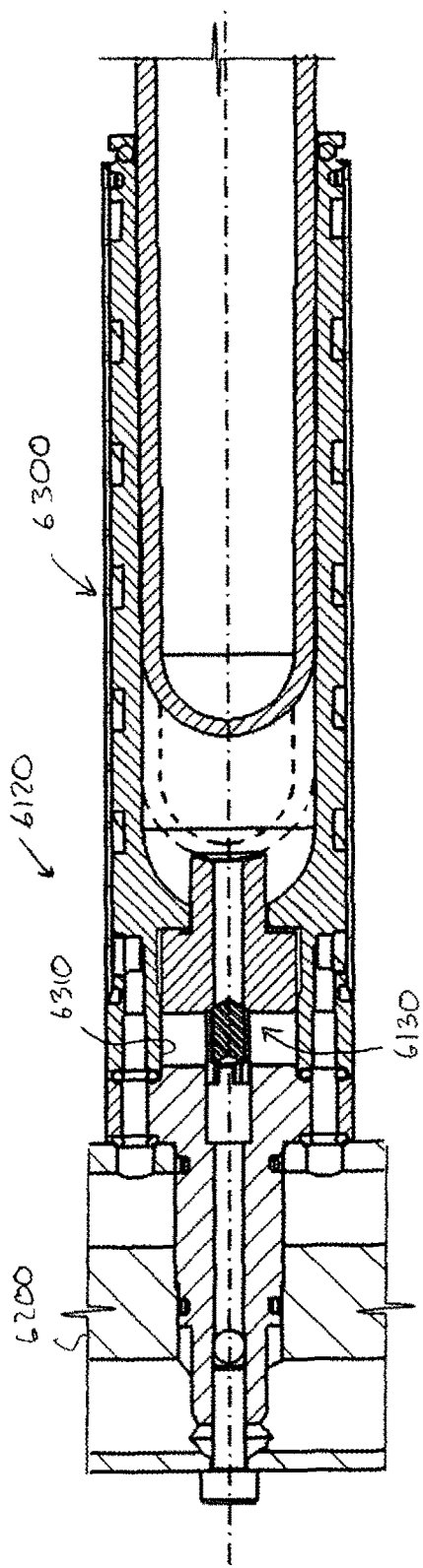
FIG. 21A
FIG. 21B

US 10,357,911 B2

COOLING PLATE ASSEMBLY FOR AN INJECTION MOLDING MACHINE

CROSS-REFERENCE TO RELATED APPLICATIONS

This application claims the benefit of U.S. Provisional Application No. 62/209,861, entitled "COOLING PLATE ASSEMBLY FOR RECEIVING AND EJECTING MOLDED ARTICLES", filed Aug. 25, 2015, and U.S. Provisional Application No. 62/279,906, entitled "COOLING PLATE ASSEMBLY FOR AN INJECTION MOLDING MACHINE", filed Jan. 18, 2016. The entire contents of each of U.S. Provisional Application No. 62/209,861 and U.S. Provisional Application No. 62/279,906 are hereby incorporated by reference.

FIELD

The disclosure relates to injection molding machines, and methods, assemblies, and apparatuses for post-mold treatment of injection molded articles, including receiving, cooling, and ejecting such articles.

BACKGROUND

U.S. Pat. No. 7,670,126 (McCready) purports to disclose a valve for controlling air flow in an air pressure channel of a molded article holder; a molded article holder co-operable with the valve; and a post-mold holding device including the molded article holder and valve.

U.S. Pat. No. 6,190,157 (Hofstetter) purports to disclose an ejector for a discharging device for the removal of preforms which enables a partially cooled preform to be detached safely from a form tool and, on complete cooling, to be likewise removed from the discharging device safely and completely.

U.S. Pat. No. 7,252,497 (Neter) purports to disclose a cooling tube assembly for operating on a malleable molded plastic part. The cooling tube assembly comprises a porous tube/insert having a profiled inner conditioning surface, and a vacuum structure configured to cooperate with the porous tube. In use, the vacuum develops a reduced pressure adjacent the inner conditioning surface to cause an outer surface of the malleable molded plastic part, locatable within the cooling tube assembly, to contact the inner conditioning surface of the porous insert so as to allow a substantial portion of the outer surface of the malleable part, upon cooling, to attain a profile substantially corresponding to the profile of the inner conditioning surface. The cooling tube assembly further includes a suction channel therein that is configured to cooperate with a valve member for the control of a suction flow therethrough that assists in a transferring of the molded article into the cooling tube assembly.

SUMMARY

The following summary is intended to introduce the reader to various aspects of the applicant's teaching, but not to define any invention.

According to some aspects, a cooling plate assembly for an injection molding machine includes: (a) a cooling plate having a plate front surface; (b) an air channel extending within a thickness of the cooling plate generally parallel to the plate front surface; and (c) a plate bore extending into the cooling plate from the plate front surface. The plate bore extends lengthwise along a plate bore axis between a plate bore first end open to the plate front surface and a plate bore second end in fluid communication with the air channel. The plate bore can provide fluid communication between the air channel and a cavity of a cooling tube mountable to the cooling plate. The cavity of the cooling tube is configured to receive at least a portion of a molded article. The assembly further includes (d) a valve within the plate bore for regulating air flow between the air channel and the cavity. The valve is movable between a first position in which a first air flow passage extending within the plate bore is open for conducting air from the cavity to the air channel to draw the molded article into the cavity, and a second position in which the first air flow passage is obstructed to reduce air flow between the cavity and the air channel, and in which a second air flow passage extending within the plate bore is open for conducting air from the air channel to the cavity to assist ejection of the molded article from the cavity.

In some examples, the valve can include a valve seat and a closure member movable relative to the valve seat. When the valve is in the first position, the closure member can be spaced apart from the valve seat and an air flow gap can be provided between the valve seat and a sealing surface of the closure member. The first air flow passage can include the air flow gap. When the valve is in the second position, the sealing surface can be in engagement with the valve seat and the air flow gap can be closed.

In some examples, the first air flow passage can include a valve port directed toward the cavity. The valve seat can circumscribe at least a portion of the valve port. When the valve is in the first position, the valve port can be unblocked, and when the valve is in the second position, the closure member can block the valve port.

In some examples, the second air flow passage can include a bypass port directed toward the cavity. When the valve is in the second position, the bypass port can be unblocked.

In some examples, the valve can include a valve housing having a hollow interior defining a valve chamber. The closure member can be movably retained within the valve chamber. The valve housing can have a front wall axially bounding the valve chamber and a first front port in the front wall. The valve port can include the first front port. In some examples, the valve housing can include a second front port in the front wall, and the bypass port can include the second front port. In some examples, the second front port laterally adjoins the first front port.

In some examples, the bypass port includes a bypass flow channel bounded radially in part by an outer surface of the valve housing. In some examples, the bypass flow channel can be bounded radially by the outer surface of the valve housing and an inner surface of the plate bore.

In some examples, the valve housing is fixed relative to the cooling plate.

In some examples, the valve can include an ejector member slidably seated within the plate bore and movable between an ejector retracted position for accommodating receipt of the portion of the molded article within the cavity and an ejector advanced position for assisting ejection of the molded article from the cavity. The valve seat can be fixed relative to the ejector member.

In some examples, the ejector member can be in the retracted position when the valve is in the first position, and the ejector member can be in the advanced position when the valve is in the second position.

In some examples, the ejector member can include a leading surface for bearing against the molded article when the ejector member moves toward the ejector advanced position, an axially opposed trailing surface directed toward the plate bore second end, and an internal first conduit extending between a first conduit first end open to the leading surface for fluid communication with the cavity and a first conduit second end open to the trailing surface for fluid communication with the air channel. The valve port can include an axial portion of the first conduit.

In some examples, the ejector member can include an internal second conduit extending generally parallel to and laterally offset from the first conduit. The bypass port can include the second conduit.

In some examples, the ejector member can include a piston in close sliding fit with an inner diameter of the plate bore. The second conduit extends axially through the piston.

In some examples, the first air flow passage can include a first duct extending within the plate bore and the second air flow passage can include a second duct extending within the plate bore. The ejector member can separate the plate bore into the first duct and the second duct. In some examples, the first duct can include the first conduit. The second duct can be bounded radially by an outer surface of the ejector member and an inner surface of the plate bore.

In some examples, drawing air from the plate bore into the air channel can urge the valve toward the first position and conducting pressurized air from the air channel into the plate bore can urge the valve toward the second position.

According to some aspects, a cooling plate assembly for an injection molding machine includes: (a) a cooling plate having a plate front surface; (b) an air channel extending within a thickness of the cooling plate generally parallel to the plate front surface; and (c) a cooling tube mounted to the cooling plate. The cooling tube has a cavity for receiving at least a portion of a molded article. The assembly further includes (d) an assembly bore extending through the cooling tube and into the cooling plate from the plate front surface. The assembly bore extends lengthwise along an assembly bore axis between an assembly bore first end open to the cavity and an assembly bore second end in fluid communication with the air channel. The assembly bore can provide fluid communication between the air channel and the cavity. The assembly further includes (e) a valve within the assembly bore for regulating air flow between the air channel and the cavity. The valve is movable between a first position in which a first air flow passage extending within the assembly bore is open for conducting air from the cavity to the air channel to draw the molded article into the cavity, and a second position in which the first air flow passage is obstructed to reduce air flow between the cavity and the air channel, and in which a second air flow passage extending within the assembly bore is open for conducting air from the air channel to the cavity to assist ejection of the molded article from the cavity.

According to some aspects, a method for receiving and ejecting molded articles includes (a) drawing air from a cooling tube cavity into an air channel through a plate bore to draw at least a portion of a molded article into the cavity; (b) moving a valve within the plate bore from a first position for conducting air from the cavity to the air channel to a second position for reducing air flow through the plate bore relative to the first position; and (c) when the valve is in the second position, urging pressurized air from the air channel to the cavity through the plate bore to assist ejection of the molded article from the cavity.

In some examples, step (b) includes moving a closure member from a disengaged position spaced apart from a valve seat in the plate bore into engagement with the valve seat.

According to some aspects, a cooling tube for an injection molding machine includes: (a) a cavity for receiving at least a portion of a molded article; and (b) a tube bore extending lengthwise along a tube bore axis between a tube bore first end open to the cavity and a tube bore second end for fluid communication with an air channel extending within a thickness of a cooling plate. The tube bore can provide fluid communication between the cavity and the air channel. The cooling tube further includes (c) a valve within the tube bore for regulating air flow between the air channel and the cavity. The valve is movable between a first position in which a first air flow passage extending within the tube bore is open for conducting air from the cavity to the air channel to draw the molded article into the cavity, and a second position in which the first air flow passage is obstructed to reduce air flow between the cavity and the air channel, and in which a second air flow passage extending within the tube bore is open for conducting air from the air channel to the cavity to assist ejection of the molded article from the cavity.

According to some aspects, a cooling plate assembly for an injection molding machine includes (a) a cooling plate having a plate front surface; (b) an air channel extending within a thickness of the cooling plate generally parallel to the plate front surface; and (c) a plate bore extending into the cooling plate from the plate front surface. The plate bore extends lengthwise along a plate bore axis between a plate bore first end open to the plate front surface and a plate bore second end in fluid communication with the air channel. The plate bore can provide fluid communication between the air channel and a cavity of a cooling tube mountable to the cooling plate. The cavity is configured to receive at least a portion of a molded article. The assembly further includes (d) an ejector member within the plate bore. The ejector member is movable relative to the cooling plate between an ejector retracted position for accommodating receipt of the portion of the molded article in the cavity and an ejector advanced position for assisting ejection of the molded article from the cavity. The assembly further includes (e) a closure member within the plate bore. The closure member is movable relative to a valve seat fixed to the ejector member between an open position and a closed position. When in the open position the closure member is spaced apart from the valve seat and an air flow gap is provided between the closure member and the valve seat for conducting air from the cavity to the air channel to draw the molded article into the cavity, and when in the closed position the closure member is in engagement with the valve seat and the air flow gap is closed for reducing air flow between the air channel and the cavity relative to the open position.

According to some aspects, a cooling plate assembly for an injection molding machine includes: (a) a cooling plate having a plate front surface; (b) an air channel extending within a thickness of the cooling plate generally parallel to the plate front surface; (c) a cooling tube mounted to the cooling plate, the cooling tube having a cavity for receiving at least a portion of a molded article; and (d) an assembly bore extending through the cooling tube and into the cooling plate from the plate front surface. The assembly bore extends lengthwise along an assembly bore axis between an assembly bore first end open to the cavity and an assembly bore second end in fluid communication with the air channel. The assembly bore can provide fluid communication between the air channel and the cavity. The assembly further includes (e) an ejector member within the assembly bore. The ejector member is movable relative to the cavity between an ejector retracted position for accommodating receipt of the portion of the molded article in the cavity and an ejector advanced position for assisting ejection of the molded article from the cavity. The assembly further includes (f) a closure member within the assembly bore. The closure member is movable relative to a valve seat fixed to the ejector member between an open position and a closed position. When in the open position the closure member is spaced apart from the valve seat and an air flow gap is provided between the closure member and the valve seat for conducting air from the cavity to the air channel to draw the molded article into the cavity, and when in the closed position the closure member is in engagement with the valve seat and the air flow gap is closed for reducing air flow between the air channel and the cavity relative to the open position.

According to some aspects, a cooling tube for an injection molding machine includes (a) a cavity for receiving at least a portion of a molded article; and (b) a tube bore extending lengthwise along a tube bore axis between a tube bore first end open to the cavity and a tube bore second end for fluid communication with an air channel extending within a thickness of a cooling plate. The tube bore can provide fluid communication between the cavity and the air channel. The cooing tube further includes (c) an ejector member within the tube bore. The ejector member is movable relative to the cavity between an ejector retracted position for accommodating receipt of the portion of the molded article in the cavity and an ejector advanced position for assisting ejection of the molded article from the cavity. The cooling tube further includes (d) a closure member within the tube bore. The closure member is movable relative to a valve seat fixed to the ejector member between an open position and a closed position. When in the open position the closure member is spaced apart from the valve seat and an air flow gap is provided between the closure member and the valve seat for conducting air from the cavity to the air channel to draw the molded article into the cavity, and when in the closed position the closure member is in engagement with the valve seat and the air flow gap is closed for reducing air flow between the air channel and the cavity relative to the open position.

According to some aspects, a method for receiving and ejecting molded articles includes: (a) drawing air from a cavity of a cooling tube into an air channel of a cooling plate to draw a portion of a molded article into the cavity. The air is drawn through an air flow gap between a movable closure member and a valve seat fixed to a movable ejector member. The method further includes (b) after step (a), urging pressurized air from the air channel toward the cavity. The pressurized air moves the closure member into engagement with the valve seat to close the air flow gap, and the pressurized air advances the ejector member relative to the cooling tube to assist ejection of the molded article from the cavity.

According to some aspects, a cooling plate assembly for an injection molding machine includes (a) a cooling plate having a plate front surface; (b) an air channel extending within a thickness of the cooling plate for conducting air to and from a cavity of a cooling tube mountable to the cooling plate; (c) a coolant channel extending within a thickness of the cooling plate for conducting coolant through the cooling tube to cool a molded article seated in the cavity; and (d) a plate bore extending into the cooling plate from the plate front surface for providing fluid communication between the air channel and the cavity of the cooling tube. The plate bore extends between a plate bore first end open to the plate front surface and a plate bore second end in fluid communication with the air channel. The plate bore intersects the coolant channel and separates a length of the coolant channel into a coolant channel first segment upstream of the plate bore and a coolant channel second segment downstream of the plate bore. The plate bore is sized for receiving a spigot portion of the cooling tube to block fluid communication through the plate bore among the air channel, the coolant channel first segment, and the coolant channel second segment. The assembly further includes (e) a valve within the plate bore for regulating air flow between the air channel and the cavity. The valve is movable between a first position for conducting air from the cavity to the air channel to draw the molded article into the cavity, and a second position for reducing air flow between the air channel and the cavity relative to the first position.

According to some aspects, a cooling plate assembly for an injection molding machine includes: (a) a cooling plate having a plate front surface; (b) an air channel extending within a thickness of the cooling plate generally parallel to the plate front surface; and (c) a cooling tube mounted to the cooling plate. The cooling tube has a cavity for receiving at least a portion of a molded article. The assembly further includes (d) an assembly bore extending through the cooling tube and into the cooling plate from the plate front surface. The assembly bore extends lengthwise along an assembly bore axis between an assembly bore first end open to the cavity and an assembly bore second end in fluid communication with the air channel. The assembly bore can provide fluid communication between the air channel and the cavity. The assembly further includes (e) a valve within the assembly bore for regulating air flow between the air channel and the cavity. The valve is movable between a first position in which the assembly bore has a first effective flow area for conducting air from the cavity to the air channel to draw the molded article into the cavity, and a second position in which the assembly bore has a second effective flow area for conducting air from the air channel to the cavity to assist ejection of the molded article from the cavity. The second effective flow area is less than the first effective flow area.

According to some aspects, a two-piece cooling plate for an injection molding machine includes: (a) a plate first portion having a first portion thickness between a cooling plate front surface and an opposed first mating surface; (b) at least one air channel extending within the first portion thickness parallel to the plate front surface; and (c) a set of plate bores extending through the first portion thickness of the plate first portion perpendicular to the air channel. Each plate bore extends lengthwise between a plate bore first end open to the plate front surface and a plate bore second end open to the first mating surface. Each plate bore can provide fluid communication between the air channel and a cavity of a respective cooling tube mountable to the plate first portion. The cavity is configured to receive at least a portion of a molded article. The plate further includes (d) a plate second portion mounted to the plate first portion. The plate second portion has a second portion thickness between a plate rear surface and an opposed second mating surface. The second mating surface is in flush engagement with the first mating surface. In some examples, the plate can further include (e) a header extending within the second portion thickness parallel to the second mating surface. The header is in fluid communication with the air channel through a mating interface of the plate first portion and the plate second portion for conducting air to and from the air channel.

According to some aspects, a cooling plate assembly for an injection molding machine includes (a) a cooling plate having a plate thickness between a plate front surface and an opposed plate rear surface, and an air channel extending within the thickness; and (b) a set of plate bores. Each plate bore extends into the cooling plate from the plate front surface. Each plate bore extends lengthwise along a plate bore axis between a plate bore first end open to the plate front surface and a plate bore second end for fluid communication with the air channel. Each plate bore can provide fluid communication between the air channel and a cavity of a respective cooling tube mountable to the cooling plate. The cavity is configured to receive at least a portion of a molded article. The air channel is axially intermediate the cooling plate front surface and each plate bore second end.

Further aspects and features of the present specification will become apparent, to those ordinarily skilled in the art, upon review of the following description of the specific examples of the specification.

BRIEF DESCRIPTION OF THE DRAWINGS

The drawings included herewith are for illustrating various examples of articles, methods, and apparatuses of the present specification and are not intended to limit the scope of what is taught in any way. In the drawings:

FIG. 3 is a cross-sectional view of a portion of the plate assembly of FIG. 2A taken along line 3-3 of FIG. 2D, shown in a first condition and showing portions of a mold half attached to a moving platen presenting a preform to the plate assembly;

FIG. 3A is an enlarged view of a portion of FIG. 3;

FIG. 4A is a cross-sectional view of a portion of the plate assembly of FIG. 2A taken along line 4A-4A of FIG. 2D, shown in the first condition;

FIG. 4B is a cross-sectional view like that of FIG. 4A, showing portions of the plate assembly of FIG. 2A in a second condition;

FIG. 5 is a rear perspective view of an ejector member portion of the plate assembly of FIG. 2A;

FIG. 6 is a partial cut-away, front perspective view of the ejector member portion of FIG. 5, showing a closure member portion of the plate assembly of FIG. 2A;

FIG. 7 is a front perspective view of the closure member portion of FIG. 6;

FIG. 9A is an enlarged view of a portion of FIG. 8A;

FIG. 9B is an enlarged view of a portion of FIG. 8B;

FIG. 10 is a front perspective view of valve portions of the plate assembly of FIG. 8A;

FIG. 10A is a partial cut-away, front perspective view of the valve portions of FIG. 10;

FIG. 11A is a cross-sectional view of a portion of an alternative cooling plate assembly for a machine like that of FIG. 1, shown in a first condition;

FIG. 11B is a cross-sectional view like that of FIG. 11A, showing portions of the plate assembly of FIG. 11A in a second condition;

FIG. 12 is a front perspective view of valve portions of the plate assembly of FIG. 11A;

FIG. 12A is a partial cut-away, front perspective view of the valve portions of FIG. 12;

FIG. 15A is a cross-sectional view of a portion of an alternative cooling plate assembly for a machine like that of FIG. 1, shown in a first condition and showing portions of a mold half attached to a moving platen presenting a preform to the cooling plate assembly;

FIG. 15B is a cross-sectional view like that of FIG. 15A, showing the plate assembly of FIG. 15A in a second condition and portions of a transfer shell receiving the preform from the plate assembly;

FIG. 21A is a cross-sectional view of a portion of an alternative cooling plate assembly for a machine like that of FIG. 1, shown in a first condition;

FIG. 21B is a cross-sectional view like that of FIG. 21A, showing the plate assembly of FIG. 21A in a second condition;

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Figure 1:
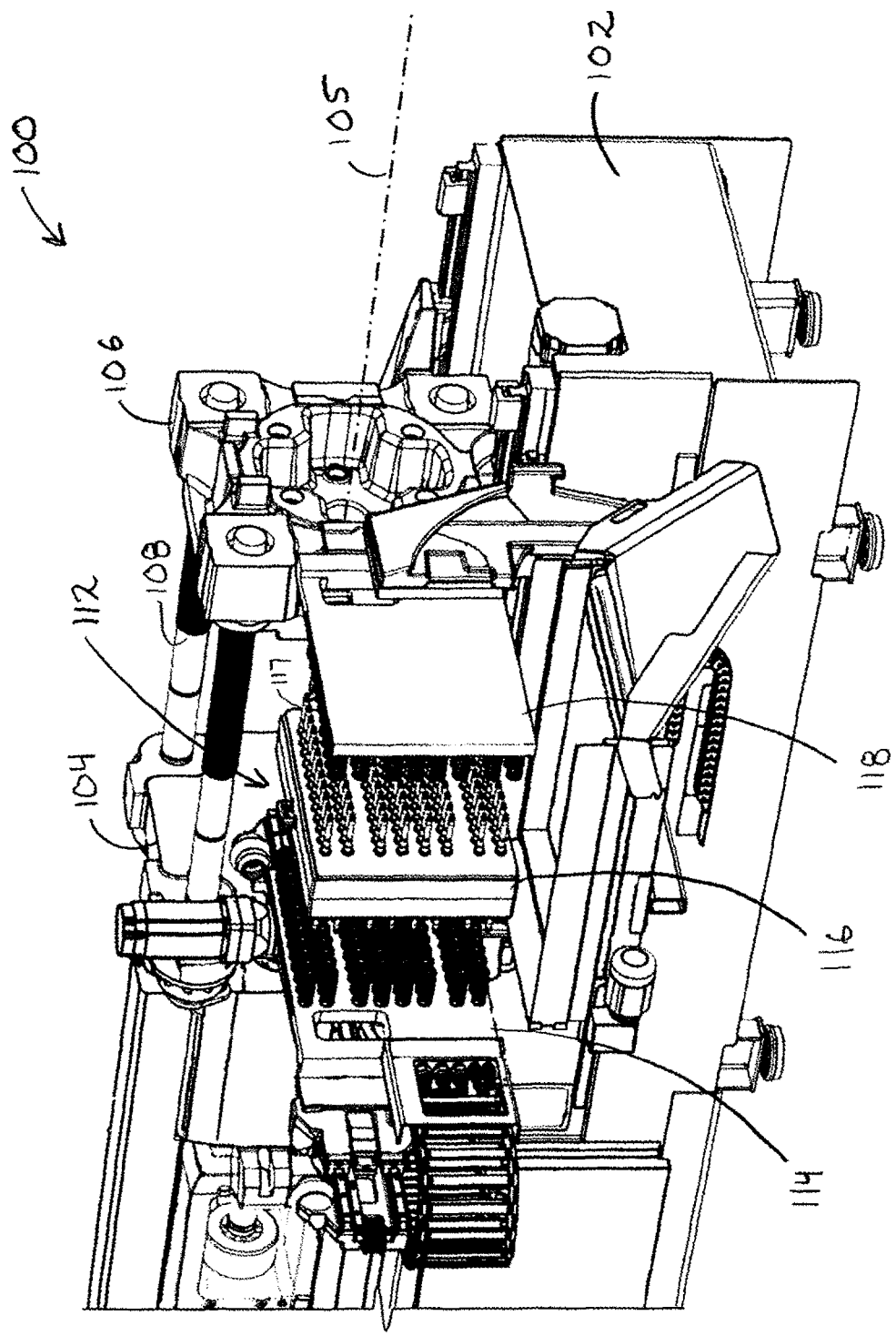
FIG. 1 is a front perspective view of the non-operator side of a portion of an injection molding machine.
Figure 2:
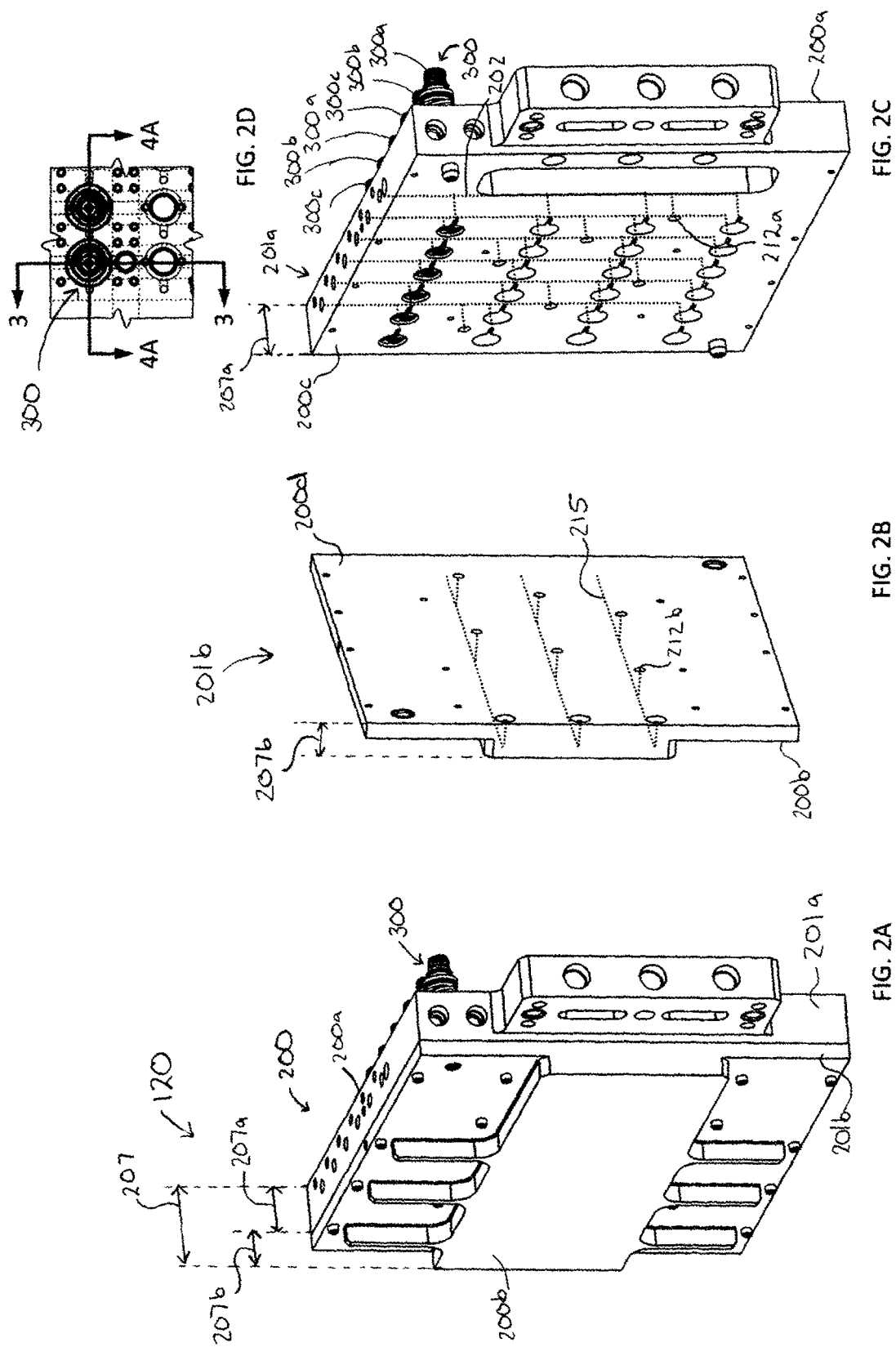
FIG. 2A is a rear perspective view of an example cooling plate assembly for a machine like that of FIG. 1.
FIG. 2B is a front perspective view of a structure of the plate assembly of FIG. 2A.
FIG. 2C is a rear perspective view of another structure of the plate assembly of FIG. 2A.
FIG. 2D is a front view of a portion of the plate assembly of FIG. 2A.

Referring to FIG. 1, an example of an injection molding machine 100 includes a base 102, with a stationary platen 104 and a moving platen 106 mounted to the base 102 and coupled via tie bars 108. The moving platen 106 can translate toward and away from the stationary platen 104 along a machine axis 105. A mold is formed between the platens 104 and 106, the mold defined at least in part by a first mold half mounted to the stationary platen 104 and a second mold half mounted to the moving platen 106. An injection unit is mounted to the base 102 for injecting resin or other mold material into the mold to form a molded article.

In the example illustrated, the injection molding machine 100 is set up for molding articles 110 (see FIG. 3; also referred to as preforms 110) that can be used as input material for subsequent processing, for example, a blow molding operation to produce beverage containers.

Referring back to FIG. 1, in the example illustrated, the injection molding machine 100 is provided with a part-handling apparatus 112 for moving and/or treating injection molded articles formed in the mold of the injection molding machine 100. The part handling apparatus 112 includes a take-out plate 114 (also referred to as take-out device 114), a rotary transfer shell 116, and an optional supplemental cooling device 118. The take-out device 114 and the supplemental cooling device 118 each include a cooling plate assembly. An example cooling plate assembly 120 for use with the take-out device 114 is described in further detail below with reference to FIGS. 2A to 7. The cooling plate assembly 120 may also be used with the supplemental cooling device 118. An example of a rotary transfer shell 116 is described in PCT Publication No. WO2013134874 (Schad et al.).

The take-out device 114 is movable between the mold and the rotary transfer shell 116 for transferring preforms from the mold to the rotary transfer shell 116. The take-out device 114 generally transfers preforms from the mold to a position outside the mold for engagement by pins 117 (see also FIG. 8B) of the rotary transfer shell 116.

In the example illustrated, the take-out device 114 is carried by a robot that can translate the take-out device 114 along a first robot axis (z-axis) between at least one take-out device advanced position in which the take-out device is disposed between the mold halves and at least one take-out device retracted position in which the take-out device 114 is clear of the mold. Furthermore, the take-out device 114 is, in the example illustrated, translatable along a second robot axis (x-axis) parallel to the machine axis 105.

The optional supplemental cooling device 118 is, in the example illustrated, movable relative to the rotary transfer shell 116 between an engaged position and a disengaged position. In the engaged position, the supplemental cooling device 118 and the rotary transfer shell 116 are drawn together. In the disengaged position, the supplemental cooling device 118 is spaced apart from the rotary transfer shell 116. In the example illustrated, the supplemental cooling device 118 is moved between the engaged and disengaged position by translation along an axis (x-axis) parallel to the machine axis 105.

In use, a first set of preforms 110 is produced in a first injection cycle. Once the preforms 110 have partially cooled, the mold is opened, and the preforms 110 are transferred from the mold to retained engagement on the take-out device 114. Once the preforms 110 are loaded onto the take-out device 114, the take-out device 114 shuttles out of the mold area, so that the mold can reclose to produce a subsequent, second set of preforms 110 in the mold.

Outside the mold, the take-out device 114 and the rotary transfer shell 116 can be drawn together, and the first set of preforms 110 can be released from retained engagement on the take-out device 114 and transferred to retained engagement on the rotary transfer shell 116. After transferring the first set of preforms 110 to the rotary transfer shell 116, the take-out device 114 can retract from the rotary transfer shell 116 (i.e., along the x-axis), and the rotary transfer shell 116 can rotate 180 degrees to move the first set of preforms 110 to face the supplemental cooling device 118.

The supplemental cooling device 118 and the rotary transfer shell 116 can be drawn together, and the first set of preforms 110 may then be released from retained engagement on the rotary transfer shell 116 and transferred to retained engagement on the supplemental cooling device 118. The first set of preforms 110 can, before the supplemental cooling device 118 disengages the rotary transfer shell 116, be transferred back to the rotary transfer shell 116. The rotary transfer shell 116 may rotate to an unload position and drop the first set of preforms 110.

Referring to FIG. 2A, an example cooling plate assembly 120 for use with the take-out device 114 and/or the supplemental cooling device 118 is shown. The cooling plate assembly 120 includes a cooling plate 200 having a plate thickness 207 between a plate front surface 200a and a plate rear surface 200b, and a plurality of cooling tubes 300 mounted to the cooling plate 200 for receiving, cooling, and ejecting a plurality of preforms 110 (FIG. 3).

In the example illustrated, the plate 200 is of a two-piece construction, and includes a plate first portion 201a mounted to a plate second portion 201b. The two-piece construction of the plate 200 may facilitate installation of components of the plate assembly 120. In the example illustrated, the plate first portion 201a has a plate first portion thickness 207a between the plate front surface 200a and an opposed first mating surface 200c (FIG. 2C). The plate second portion 201b has a plate second portion thickness 207b between the plate rear surface 200b and an opposed second mating surface 200d (FIG. 9B). When assembled together, the second mating surface 200d is in flush engagement with the first mating surface 200c.

Referring to FIGS. 3 to 4B, a representative cooling tube 300 connected to the cooling plate 200 is shown. Referring to FIG. 3, in the example illustrated, the cooling tube 300 includes a cooling tube body 302 having a body cavity portion 302a projecting from the cooling plate front surface 200a along a central cooling tube axis 301. The body cavity portion 302a has a base adjacent the plate front surface 200a and an opening to receive preforms 110 opposite the base.

In the example illustrated, the body cavity portion 302a includes the cavity 306. In the example illustrated, the cavity 306 is at least partially defined by an inner cavity surface 308 of the body cavity portion 302a. The cavity surface 308 generally matches the outer profile of the portion of the preform 110 received within the cavity 306. At least a portion of the outer surface of the preform 110 that is targeted for cooling bears against the cavity surface 308.

In the example illustrated, the cavity 306 extends lengthwise along a cavity axis between an open outer end 306a spaced axially apart from the plate front surface 200a for receiving the preform 110, and an opposed, generally closed bottom end 306b. The bottom end 306b is generally concave, and is configured to engage a dome portion of the preform 110 when the preform 110 is seated within the cavity 306. The cavity axis is generally coaxial with the cooling tube axis 301.

Referring to FIG. 4A, the cooling plate 200 includes at least one fluid channel 202 extending within the thickness 207 of the plate 200 generally parallel to the plate front surface 200a (see also FIG. 2C). The fluid channel 202 extends within the thickness 207a of the plate first portion 201a in the example illustrated. The fluid channel 202 can conduct fluid. In the example illustrated, the fluid is air, and the fluid channel 202 is also referred to herein as air channel 202. The air channel 202 is in fluid communication with a vacuum source during a first time period for suctioning air from cooling tube cavities 306 of respective cooling tubes 300 to draw preforms 110 into respective cavities 306. In the example illustrated, the air channel 202 is in fluid communication with a pressure source during a second time period for conducting pressurized air from the air channel 202 toward the cavities 306 to assist ejection of preforms 110 from respective cavities 306.

Referring to FIG. 2B, in the example illustrated, a feed line 215 (FIG. 2B; also referred to as a header 215) provides fluid communication between the air channel 202 and the pressure source/vacuum source. The header 215 extends within the thickness 207 of the plate 200. In the example illustrated, the header 215 extends within the thickness 207b of the plate second portion 201b, and is in fluid communication with the air channel 202 across a mating interface of the plate first portion 201a and the plate second portion 201b.

Referring to FIGS. 2B and 2C, in the example illustrated, the mating interface includes a mating bore. The mating bore has a mating bore first portion 212a open to the first mating surface 200c and extending into the plate first portion 201a for fluid communication with the air channel 202, and a mating bore second portion 212b open to the second mating surface 200d and extending into the plate second portion 201b for fluid communication with the header 215.

Referring to FIG. 3A, in the example illustrated, the plate assembly 120 includes an assembly bore 410 for providing fluid communication between the air channel 202 and the cavity 306. In the example illustrated, the assembly bore 410 extends lengthwise along an assembly bore axis between an assembly bore first end 411a open to the cavity 306 and an assembly bore second end 411b in fluid communication with the air channel 202 (see also FIG. 4B). In the example illustrated, the assembly bore first end 411a is open to the bottom end 306b of the cavity 306. In the example illustrated, the assembly bore axis is generally coaxial with the cooling tube axis 301.

Referring to FIG. 4B, in the example illustrated, the assembly bore 410 comprises a tube bore 310. In the example illustrated, the tube bore 310 extends through the cooling tube body 302 lengthwise along a tube bore axis between a tube bore first end 311a for fluid communication with the cavity 306 and a tube bore second end for fluid communication with the air channel 202. In the example illustrated, the tube bore first end 311a is open to the cavity 306. The assembly bore first end 411a is defined by the tube bore first end 311a in the example illustrated. In the example illustrated, the tube bore axis is generally coaxial with the cooling tube axis 301.

In the example illustrated, the assembly bore 410 further comprises a plate bore 210 extending into the plate 200 from the plate front surface 200a. The plate bore 210 extends lengthwise along a plate bore axis between a plate bore first end 211a open to the plate front surface 200a and a plate bore second end 211b in fluid communication with the air channel 202. In the example illustrated, each plate bore 210 extends through the thickness 207a of the plate first portion 201a, and the plate bore second end 211b is open to the first mating surface 200c (see also FIG. 2C). The assembly bore second end 411b is defined by the plate bore second end 211b in the example illustrated. The plate bore axis 201 is generally coaxial with the cooling tube axis 301.

In the example illustrated, the air channel 202 is laterally offset from the plate bore 210. In the example illustrated, the cooling plate 200 includes a plate conduit 238 providing fluid communication between the air channel 202 and the plate bore second end 211b. The plate conduit 238 extends lengthwise generally parallel to the plate bore 210 and perpendicular to the air channel 202, between a plate conduit first end 238a open to the air channel 202 and a plate conduit second end 238b open to the plate bore second end 211b. In the example illustrated, the air channel 202 is axially (in a direction generally perpendicular to the plate front surface 200a) intermediate the plate front surface 200a and the plate bore second end 211b. This may facilitate a reduction in thickness and/or complexity of the plate 200 relative to cooling plates in which air channels are axially intermediate the plate rear surface and the plate bore second end.

Referring to FIG. 3, the cooling plate 200 includes at least one coolant channel 204 extending within the thickness 207 of the cooling plate 200 generally parallel to the plate front surface 200a. The coolant channel 204 is in fluid communication with a coolant source for conducting coolant to facilitate cooling of preforms 110 seated within respective cavities 306. In the example illustrated, the coolant is liquid water. In the example illustrated, the coolant channel 204 extends within the thickness 207a of the plate first portion 201a. In the example illustrated, the coolant channel 204 is axially intermediate the air channel 202 and the cooling plate front surface 200a.

Referring to FIG. 3A, in the example illustrated, the plate bore 210 intersects the coolant channel 204. The plate bore 210 separates a length of the coolant channel 204 into a coolant channel first segment 204a upstream of the plate bore 210 and a coolant channel second segment 204b downstream of the plate bore 210.

In the example illustrated, the cooling tube body 302 further includes a spigot portion 302b extending axially from the base of the body cavity portion 302a. In the example illustrated, the plate bore 210 is sized to receive the spigot portion 302b in close fit. The spigot portion 302b extends into the plate bore 210 from the plate front surface 200a. The tube bore second end 311b is open to an axial endface 303 of the spigot portion 302b.

In the example illustrated, the spigot portion 302b intersects the coolant channel 204, and blocks fluid communication through the plate bore 210 between the coolant channel first segment 204a and the coolant channel second segment 204b. In the example illustrated, the spigot portion 302b blocks fluid communication through the plate bore 210 between the air channel 202 and the coolant channel 204. In the example illustrated, the cooling tube 300 includes a spigot seal 305 comprising an O-ring mounted in a groove on the outer surface of the spigot portion 302b. The spigot seal 305 is axially intermediate the coolant channel 204 and the axial endface 303 of the spigot portion 302b. The spigot seal 305 can help block fluid flow between the outer surface of the spigot portion 302b and the inner surface of the plate bore 210.

Still referring to FIG. 3A, in the example illustrated, the cooling tube body 302 includes a cooling conduit 304 extending along the sidewalls of the body cavity portion 302a between a coolant inlet 304a and a coolant outlet 304b. The cooling conduit 304 can conduct coolant to help transfer heat away from the body cavity portion 302a and facilitate cooling of a preform 110 seated within the cavity 306. In the example illustrated, the coolant inlet 304a is in fluid communication with the coolant channel first segment 204a for conducting coolant into the cooling conduit 304. The coolant outlet 304b is in fluid communication with the coolant channel second segment 204b for conducting fluid out from the cooling conduit 304. In the example illustrated, the cooling conduit 304 extends helically along the sidewalls of the body cavity portion 302a.

Referring to FIG. 4A, in the example illustrated, the plate assembly 120 includes a valve 130 within the assembly bore 410 for regulating air flow between the air channel 202 and the cavity 306. All or portions of the valve 130 can be retained in the plate bore 210 or the tube bore 310. In the example illustrated, the valve 130 is retained within the plate bore 210.

In the example illustrated, the valve 130 is movable between a first position (FIG. 4A) and a second position (FIG. 4B). Referring to FIG. 4A, when the valve is in the first position, a first air flow passage 332a extending within the assembly bore 410 is open for conducting air from the cavity 306 to the air channel 202 to help draw the preform 110 into the cavity 306.

Referring to FIG. 4B, when the valve 130 is in the second position, the first air flow passage 332a is obstructed to reduce air flow between the air channel 202 and the cavity 306 relative to the first position. A second air flow passage 332b extending within the assembly bore 410 is open for conducting air from the air channel 202 to the cavity 306 when the valve 130 is in the second position. Pressurized air can be conducted from the air channel 202 to the cavity 306 through the second air flow passage 332b when the valve is in the second position to assist ejection of the preform 110 from the cavity 306.

In the example illustrated, when the valve 130 is in the first position, the assembly bore 410 has a first effective flow area for conducting air from the cavity 306 to the air channel 202 to draw a preform 110 into the cavity 306. The first effective flow area is defined at least in part by the first air flow passage 332a. When the valve 130 is in the second position, the assembly bore 410 has a second effective flow area for conducting air from the air channel 202 to the cavity 306 to assist ejection of the preform 110 from the cavity 306. The second effective flow area is defined at least in part by the second air flow passage 332b. The second effective flow area is less than the first effective flow area.

In the example illustrated, drawing air from the assembly bore 410 into the air channel 202 urges the valve 130 toward the first position. Conducting pressurized air from the air channel 202 into the assembly bore 410 urges the valve 130 toward the second position.

Referring to FIG. 4A, in the example illustrated, the valve 130 includes a closure member 330 (see also FIG. 7) and a valve seat 336 for engagement by the closure member 330. In the example illustrated, the closure member 330 is movably retained within a valve chamber 342 between the valve seat 336 and an axially spaced apart retaining surface 394. In the example illustrated, the second mating surface 200d of the plate second portion 201b comprises the retaining surface 394.

The closure member 330 is movable relative to the valve seat 336 between an open position (FIG. 4A) in which the first air flow passage 332a is open for conducting air from the cavity 306 to the air channel 202, and a closed position (FIG. 4B) in which the closure member 330 obstructs the first air flow passage 332a to reduce air flow between the air channel 202 and the cavity 306 relative to the open position. In the example illustrated, when the valve 130 is in the first position, the closure member 330 is in the open position. When the valve 130 is in the second position, the closure member 330 is in the closed position. In the example illustrated, the closure member 330 translates axially between the open and closed positions along a closure member axis. In the example illustrated, the closure member axis is generally coaxial with the cooling tube axis 301.

In the example illustrated, the valve 130 includes a valve port 131 directed toward the cavity 306. The valve seat 336 circumscribes at least a portion of the valve port 131. In the example illustrated, the first air flow passage 332a comprises the valve port 131. Referring to FIG. 4A, when the valve 130 is in the first position, the valve port 131 is unblocked and the air flow passage 332a is open. Referring to FIG. 4B, when the valve is in the second position, the closure member 330 blocks the valve port 131 and the first air flow passage 332a is obstructed.

In the example illustrated, the closure member 330 has a sealing surface 338 (FIG. 7) in facing relation to the valve seat 336 for engaging and disengaging the valve seat 336. Referring to FIG. 4A, when the closure member 330 is in the open position, the closure member 330 is spaced axially apart (disengaged) from the valve seat 336, and an air flow gap 340 is provided between the valve seat 336 and the sealing surface 338. In the example illustrated, the first air flow passage 332a comprises the air flow gap 340. Referring to FIG. 4B, when the closure member 330 is in the closed position, the sealing surface 338 is in engagement with the valve seat 336, the air flow gap 340 is closed, and the first air flow passage 332a is obstructed.

In the example illustrated, the valve 130 includes an optional ejector member 320 (see also FIGS. 5 and 6) slidably seated within the assembly bore 410. The valve seat 336 is fixed relative to the ejector member 320 in the example illustrated. The ejector member 320 is movable relative to the cooling plate 200 (and the cavity 306) between an ejector retracted position (FIG. 4A) and an ejector advanced position (FIG. 4B).

Referring to FIG. 4A, in the example illustrated, the ejector member 320 accommodates receipt the preform 110 in the cavity 306 when in the ejector retracted position. Referring to FIG. 4B, the ejector member 420 can assist ejection of the preform 110 from the cavity 306 when moving toward the ejector advanced position. In the example illustrated, when the valve 130 is in the first position, the ejector member 320 is in the ejector retracted position. When the valve 130 is in the second position, the ejector member 320 is in the ejector advanced position.

Referring to FIG. 4B, in the example illustrated, the ejector member 320 includes a leading surface 322a (see also FIG. 6) which protrudes into the cavity 306 for bearing against a preform 110 when the ejector member 320 moves toward the ejector advanced position. Referring to FIG. 4A, the leading surface 322a is clear of the cavity 306 when the ejector member 320 is in the ejector retracted position. When the ejector member 320 is in the ejector retracted position, the leading surface 322a defines a central portion of the closed bottom end 306b of the cavity 306.

In the example illustrated, the ejector member 320 extends lengthwise along an ejector member axis, and translates axially between the ejector retracted and ejector advanced positions along the ejector member axis. The ejector member axis is generally coaxial with the cooling tube axis 301.

In the example illustrated, the first air flow passage 332a comprises a first duct 334a extending within the assembly bore 410, and the second air flow passage 332b comprises a second duct 334b extending within the assembly bore 410. The ejector member 320 separates the assembly bore 410 into the first duct 334a and the second duct 334b in the example illustrated.

Referring to FIG. 6, in the example illustrated, the ejector member 3320 includes an internal first conduit 329 for providing fluid communication between the cavity 306 and the air channel 202. The first duct 334a comprises the first conduit 329 in the example illustrated. When the valve 130 is in the first position, the first conduit 329 (and the first duct 334a) is unblocked and the first air flow passage 1332a is open. When the valve is in the second position, the closure member blocks the first conduit 329 and the first air flow passage 332a is obstructed.

In the example illustrated, the first conduit 329 extends lengthwise along a first conduit axis between a first conduit first end 329a in fluid communication with the cavity 306, and a first conduit second end 329b for fluid communication with the air channel 202. Referring to FIGS. 5 and 6, in the example illustrated, the first conduit first end 329a is open to the leading surface 322a of the ejector member 320, and the first conduit second end 329b is open to a trailing surface 322b of the ejector member 320. The first conduit axis is generally coaxial with the cooling tube axis 301.

Referring to FIG. 4B, in the example illustrated, the valve chamber 342 is defined at least in part by a portion of the first conduit 329. In the example illustrated, the first conduit 329 has a conduit first axial portion open to the leading surface 322a of the ejector member 320 and a conduit second axial portion open to the trailing surface 322b (see also FIG. 6). In the example illustrated, the conduit second axial portion defines at least a portion of the valve chamber 342.

In the example illustrated, the first conduit 329 is stepped, and the conduit second axial portion has a larger diameter than the conduit first axial portion. At the transition between the conduit first axial portion and the conduit second axial portion, the first conduit 329 has an inner surface portion directed toward the assembly bore second end 411b. In the example illustrated, the inner surface portion is generally conical. The inner surface portion of the first conduit 329 comprises the valve seat 336 in the example illustrated. In the example illustrated, the valve port 131 comprises the conduit first axial portion.

Referring to FIG. 4A, in the example illustrated, the ejector member 320 includes an ejector piston 324, and an ejector pin 326 extending from the ejector piston 324 toward the cavity 306. In the example illustrated, the ejector piston 324 is retained within the plate bore 210, and the ejector pin 326 extends within the plate bore 210 and the tube bore 310 toward the cavity 306. A forward surface of the ejector pin 326 comprises the leading surface 322a of the ejector member 320. In the example illustrated, the ejector piston 324 is of integral, unitary one-piece construction with the ejector pin 326, and can be inserted into the plate bore 210 through the plate bore second end 211b prior to attaching the plate first portion 201a to the plate second portion 201b.

Referring to FIG. 4B, in the example illustrated, the ejector piston 324 is slidably retained within a piston chamber 328. In the example illustrated, the plate bore 210 has a plate bore first axial portion extending from the plate bore first end 211a toward the plate bore second end 211b, and a plate bore second axial portion extending from the plate bore first axial portion toward the plate bore second end 211b. The plate bore 210 is stepped, with the plate bore second axial portion having a larger inner diameter than that of the plate bore first axial portion. The plate bore second axial portion comprises the piston chamber 328 in the example illustrated.

In the example illustrated, the ejector piston 324 is in close sliding fit with the inner diameter of the plate bore 210. In the example illustrated, the ejector member 320 includes an ejector seal 325 mounted in a groove on the outer surface of the ejector piston 324. The ejector seal 325 can comprise an o-ring and/or a glide ring. The ejector seal 325 can help the air flow to urge translation of the ejector piston 324 by inhibiting leakage of air around a periphery of the ejector piston 324. The ejector seal 325 also helps maintain radial alignment of the ejector piston 324 within the plate bore 210 and can reduce friction between the piston 324 and the plate bore 210 to help achieve smooth, low-resistance movement of the ejector member between the ejector advanced and retracted positions.

Referring to FIG. 4A, in the example illustrated, at least a portion of the second duct 334b is bounded radially by an outer surfaces of the ejector member 320 and inner surfaces of the assembly bore 410. In the example illustrated, the second duct 334b is bounded radially by an outer surface of the ejector pin 326 and an inner surface of the assembly bore 410. In the example illustrated, the ejector pin 326 includes an ejector neck 344 extending from the ejector piston 324 toward the cavity 306. The outer diameter of the ejector neck 344 is less than an inner diameter of the assembly bore 410. In the example illustrated, an annular space 348 is provided between the radially outer surface of the ejector neck 344 and the inner surface of the assembly bore 410. The second duct 334b comprises the annular space 348 in the example illustrated.

Referring to FIG. 5, in the example illustrated, the ejector member 320 includes an ejector head 346 extending from the ejector neck 344 to the leading surface 322a of the ejector member 320. The ejector head 346 is generally cylindrical and has an outer diameter sized to provide a close sliding fit between the radially outer surface of the ejector head 346 and the inner surface of the tube bore 310. In the example illustrated, material is removed from the radially outer surface of the ejector head 346 at discrete location around the circumference of the ejector header. The material removal portions may take the form of diametrically opposed flats. The removed material provides an air flow space 350 between the outer surface of the ejector head 346 and the inner surface of the tube bore 310. The second duct 334b comprises the air flow space 350.

Referring to FIG. 4B, in the example illustrated, the ejector head 346 includes an ejector lip 352 extending to the leading surface 322a. In the example illustrated, the outer diameter of the ejector lip 352 is sized to have a close sliding fit within the tube bore 310. No flats or other material removal portions are provided around the circumference of the ejector lip 352, and very little or no space is provided between the outer surface of the lip 352 and the inner surface of the tube bore 310.

Referring to FIG. 4A, in the example illustrated, when the ejector member 320 is in the ejector retracted position, the ejector lip 352 is seated within the tube bore 310 adjacent the tube bore first end 311a and may inhibit air flow between the cavity 306 and the second duct 334b through tube bore first end 311a. Referring to FIG. 4B, when the ejector member 320 is in the ejector advanced position, the ejector lip 352 protrudes into the cavity 306 and is clear of the tube bore 310, and air flow is permitted between the cavity 306 and the second duct 334b through the tube bore first end 311a.

Referring to FIG. 4B, in the example illustrated, the valve 130 includes a bypass port 133. In the example illustrated, the second air flow passage 332b comprises the bypass port 133. When the valve is in the second position, the bypass port 133 is generally unblocked and the second air flow passage 1332b is open conducting air from the air channel 202 to the cavity 306.

In the example illustrated, the ejector member 320 includes an internal second conduit 354 extending lengthwise along a second conduit axis. The second conduit axis is parallel to and laterally offset from the first conduit axis. The bypass port 133 comprises the second conduit 354 in the example illustrated.

In the example illustrated, the second conduit 354 extends axially through the ejector piston 324 for providing fluid communication between the air channel 202 and the second duct 334b. In the example illustrated, the second conduit first end is open to a front face of the ejector piston 324 directed toward the plate bore first end 211a, and the second conduit second end is open to an axially opposed rear face of the ejector piston 324 directed toward the plate bore second end 211b.

Referring to FIG. 5, in the example illustrated, the ejector member 320 further includes at least one spacer 356 extending axially from the ejector piston 324 toward the plate bore second end 211b. In the example illustrated, the ejector member 320 includes four spacers 356. In the example illustrated, the spacers 356 space apart portions of the trailing surface 322b of the ejector member 320 from the second mating surface 200d when the ejector member 320 is in the ejector retracted position. This spacing may facilitate fluid communication between the air channel 202 and the first conduit 329.

Referring to FIG. 7, in the example illustrated, the closure member 330 has a closure member body 360 extending between the sealing surface 338 and an axially opposed trailing surface 362. The closure member body 360 has an outer diameter generally equal to the inner diameter of the portion of the valve chamber 342 defined by the first conduit 329. In the example illustrated, material is removed from the outer surface of the closure member body 360 to provide a plurality of axially extending and circumferentially spaced apart closure member channels 364. When the closure member 330 is in the open position, the closure member channels 364 permit air flow through the valve chamber 342. When the closure member 330 is in the closed position, engagement of the sealing surface 338 with the valve seat 336 inhibits air flow through the valve chamber 342.

In the example illustrated, the closure member 330 further includes a plurality of legs 366 extending axially from the trailing surface 362 of the closure member body 360. In the example illustrated, the legs 366 space apart portions of the trailing surface 362 of the closure member 330 from the second mating surface 200d when the closure member 330 is in the open position. This spacing may facilitate translation of the closure member 330 toward the closed position when pressurized air is conducted into the plate bore 210 from the air channel 202.

An example of operation of the cooling plate assembly 120 will now be described. Referring to FIG. 3, the cooling tube 300 is shown in a position in which the take-out device 114 is disposed between the mold halves. The preform 110 is shown spaced apart from the mold core by, for example, a mold ejector mechanism. Pressurized air can be subsequently fed through the mold core to urge the preform 110 further away from the mold core toward the cooling tube 300.

Referring to FIG. 4A, as the pressurized air is fed through the mold core, a suction source provides negative air pressure in the air channel 202 of the plate assembly 120 to assist removal of the preform 110 from the mold. The negative air pressure urges the valve toward the first position. The closure member 330 is urged toward the open position (in which the closure member 330 is retracted relative to the ejector member 320 and spaced apart from the valve seat 336), and the ejector member 320 is urged toward the ejector retracted position (in which the ejector member 320 is retracted relative to the cooling plate 200 and the cavity 306).

Once the closure member 330 disengages the valve seat 336, the negative air pressure draws air from the cavity 306 of the cooling tube 300 into the air channel 202 through the open first air flow passage 332a to create a vacuum force in the cavity 306. This vacuum force can help draw the preform 110 from the mold core into the cavity 306.

Once the preform 110 is seated within the cavity 306, thermal energy in the preform 110 is transferred to the coolant flowing in the cooling conduit 304 via the cooling tube body 302. After the preform 110 has been held in the cavity 306 for a desired period of time, the preform 110 is ejected from the cooling tube 300 and, in the example illustrated, moved to the transfer shell.

To assist ejection of the preform 110 from the cavity 306, the negative air pressure in the air channel 202 is replaced with a supply of pressurized air. Referring to FIG. 4B, in the example illustrated, the pressurized air urges the valve 130 toward the second position. The closure member 330 is urged toward the closed position to close the gap 340 (FIG. 4A) and obstruct the first air flow passage 332a, and the ejector member 320 is urged toward the ejector advanced position. The sealing surface 338 of the closure member 330 is urged to bear against the valve seat 336 fixed to the ejector member 320, and continued force can urge the ejector member 320 toward the ejector advanced position.

In the example illustrated, as the ejector member 320 advances toward the ejector advanced position, the leading surface 322a of the ejector member 320 bears against the preform 110 to assist ejection of the preform 110 from the cavity 306. The ejector seal 325 can help to build air pressure behind the ejector piston 324 to forcefully urge the ejector member 320 toward the ejector advanced position. Once the ejector lip 352 of the ejector member 320 is clear of the tube bore first end 311a and the preform 110 is partially displaced, the pressurized air can be urged from the air channel 202 to the cavity 306 through the second air flow passage 332b. This can build air pressure behind the preform to further assist ejection of the preform 110 from the cavity 306.

When the valve 130 is in the second position, air flow from the air channel 202 to the cavity 306 is reduced significantly relative to the first position. In the example illustrated, air flow from the air channel 202 to the cavity 306 is reduced via the closure member 330 obstructing the first air flow passage 332*a* when in the closed position. This can reduce the amount of air venting to atmosphere after the preform 110 is ejected from the cavity 306. This in turn can help to make more air pressure available to any remaining cavities 306 still holding preforms 110 for assisting ejection of such remaining preforms 110, and can help improve the overall energy efficiency and reliability of the system.

After a preform 110 has been ejected (e.g., transferred to retained engagement on a pin 117 of the rotary transfer shell 116), supply of positive air pressure to the air channel 202 is replaced with negative air pressure (from the suction source). This can urge the valve 130 back toward the first position and generates a vacuum force in the cavity 306 to help draw the next preform 110 into the cavity 306.

Referring to FIGS. 2A-2C, the cooling plate assembly 120 can be configured for multiple stage cooling operation, in which preforms 110 of a first injection cycle can remain resident in a particular set of cooling tubes during at least one subsequent injection cycle. In the example illustrated, the cooling plate assembly 120 is configured for use with 24 cooling tubes 300 (six of which are shown in FIGS. 2A and 2C) and an eight-cavity mold to provide three sets of eight cooling tubes 300 (i.e. a first set of eight first cooling tubes 300*a*, a second set of eight second cooling tubes 300*b*, and a third set of eight third cooling tubes 300*c*). The first cooling tubes 300*a* can receive preforms 110 from a first injection cycle, the second cooling tubes 300*b* can receive preforms 110 from a second injection cycle, and the third cooling tubes 300*c* can receive preforms 110 from a third injection cycle. Before the cooling plate 200 enters the mold area a fourth time, the preforms 110 in the first cooling tubes 300*a* can be transferred to the rotary transfer shell 116.

In the example illustrated, the plate 200 includes three headers 215, each in fluid communication with two respective air channels 202. In the example illustrated, the plate 200 includes six air channels 202, each for conducting air to and from four respective cooling tube cavities 306 through respective plate bores 210.

Figure 8A:
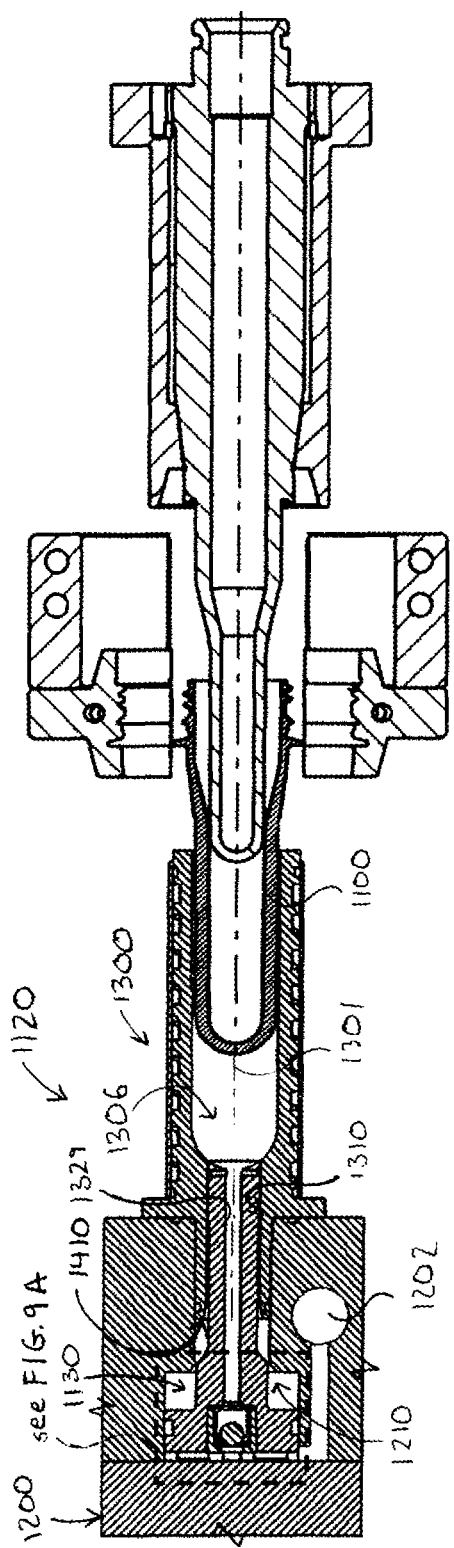
FIG. 8A is a cross-sectional view of a portion of an alternative cooling plate assembly for a machine like that of FIG. 1, shown in a first condition and showing portions of a mold half attached to a moving platen presenting a preform to the plate assembly.

Referring to FIG. 8A, another example of a cooling plate assembly 1120 for use with the take-out device 114 and/or the supplementary cooling device 118 is illustrated. The plate assembly 1120 has similarities to the plate assembly 120, and like features are identified by like reference characters, incremented by 1000.

In the example illustrated, the plate assembly 1120 includes a cooling plate 1200, an air channel 1202 extending within a thickness of the plate 1200, a cooling tube 1300 mounted to the cooling plate 1200 and extending lengthwise along a cooling tube axis 1301, and an assembly bore 1410 for providing fluid communication between the air channel 1202 and a cavity 1306 of the cooling tube 1300. The assembly bore 1410 comprises a plate bore 1210 and a tube bore 1310.

Figure 8B:
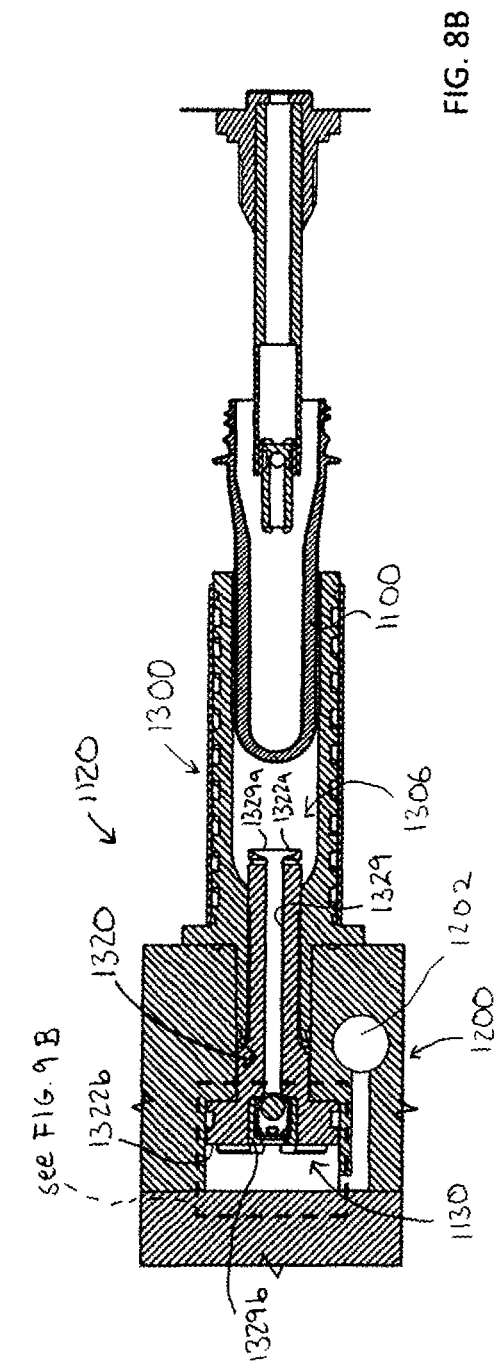
FIG. 8B is a cross-sectional view like that of FIG. 8A, showing portions of the plate assembly of FIG. 8A in a second condition and portions of a transfer shell receiving the preform from the plate assembly.

In the example illustrated, the plate assembly 1120 includes a valve 1130 within the assembly bore 1410 for regulating air flow between the air channel 1202 and the cavity 1306. The valve 1130 is movable between a first position (FIG. 8A) and a second position (FIG. 8B). Referring also to FIG. 9A, when the valve 1130 is in the first position, a first air flow passage 1332*a* extending within the assembly bore 1410 is open for conducting air from the cavity 1306 to the air channel 1202 to draw a preform 1110 into the cavity 1306.

Referring to FIG. 9B, when the valve 1130 is in the second position, the first air flow passage 1332*a* is obstructed to reduce air flow between the air channel 1202 and the cavity 1306 relative to the first position. When the valve 1130 is in the second position, a second air flow passage 1332*b* extending within the assembly bore 1410 is open for conducting air from the air channel 1202 to the cavity 1306 to assist ejection of the preform 1110 from the cavity 1306.

Referring to FIG. 9A, in the example illustrated, the valve 1130 includes a closure member 1330 and a valve seat 1336 for engagement by the closure member 1330. The closure member 1330 is movable relative to the valve seat 1336 between an open position (FIG. 9A) and a closed position (FIG. 9B). In the example illustrated, the closure member 1330 is movably retained within a valve chamber 1342 between the valve seat 1336 and an axially spaced apart retaining surface 1394 (FIG. 9B). The closure member 1330 comprises a ball in the example illustrated.

Referring to FIG. 10, in the example illustrated, the valve 1130 includes a valve port 1131 directed toward the cavity 1306. The valve seat 1336 circumscribes at least a portion of the valve port 1131 in the example illustrated. Referring to FIG. 9A, in the example illustrated, the first air flow passage 1332*a* comprises the valve port 1131. When the valve 1130 is in the first position, the valve port 1131 is unblocked and the first air flow passage 1332*a* is open. Referring to FIG. 9B, when the valve is in the second position, the closure member 1330 blocks the valve port 1131 and the first air flow passage 1332*a* is obstructed.

In the example illustrated, the valve 1130 includes a bypass port 1133. Referring to FIG. 9B, in the example illustrated, the second air flow passage 1332*b* comprises the bypass port 1133. When the valve is in the second position, the bypass port 1133 is generally unblocked and the second air flow passage 1332*b* is open for conducting air from the air channel 1202 to the cavity 1306.

Referring to FIGS. 10 and 10A, in the example illustrated, the valve 1130 includes a valve housing 1372. The valve housing 1372 has a hollow interior comprising the valve chamber 1342, and an inner surface defining the valve seat 1130. In the example illustrated, the valve housing 1372 extends lengthwise along a valve housing axis. The valve housing axis is generally coaxial with the cooling tube axis 1301. In the example illustrated, the valve housing 1372 is of two-piece construction.

Referring to FIG. 10A, in the example illustrated, the valve housing 1372 includes a front wall 1386 having a front wall front face 1372*a* directed toward the cavity 1306 and an axially opposed front wall rear face 1372*b*. The valve chamber 1342 is bounded axially by the front wall rear face 1372*b*.

Referring to FIG. 10, in the example illustrated, the valve housing 1372 has a first front port 1374 in the front wall 1386. The valve port 1131 comprises the first front port 1374 in the example illustrated. The first front port 1374 is generally coaxial with the cooling tube axis 1301.

In the example illustrated, the valve housing 1372 has a second front port 1378 in the front wall 1386. The bypass port 1133 comprises the second front port 1378. In the example illustrated, the second front port 1378 comprises two second front port openings 1378*a*, 1378*b* in the front wall 1386. The second front port openings 1378*a*, 1378*b* laterally adjoin the first front port 1374. In the example illustrated, the two second front port openings 1378*a*, 1378*b* are spaced 180 degrees apart from each other about the periphery of the first front port 1374.

In the example illustrated, the valve housing 1372 includes a sidewall 1388 extending rearward from the front wall 1386. The valve chamber 1342 is bounded radially by an inner surface of the sidewall 1388. The valve housing 1372 further includes a plurality of retainers 1395 spaced axially apart from the front wall rear face 1372*b* and extending radially inwardly from the sidewall 1388. The retainers 1395 comprise the retaining surface 1394 in the example illustrated.

Referring to FIG. 8B, in the example illustrated, the valve 1130 includes an ejector member 1320 slidably seated within the plate bore 1210 and movable relative to the cooling plate 1200 (and the cavity 1306) between an ejector retracted position (FIG. 8A) and an ejector advanced position (FIG. 8B). The valve seat 1336 is fixed relative to the ejector member 1320 in the example illustrated.

Referring to FIG. 8B, in the example illustrated, the ejector member 1320 includes an internal first conduit 1329 extending between a conduit first end 1329*a* open to a leading surface 1322*a* of the ejector member 1320, and a conduit second end 1329*b* open to a trailing surface 1322*b* of the ejector member 1320.

Referring to FIG. 9A, in the example illustrated, the valve housing 1372 is retained within the first conduit 1329 and fixed relative to the ejector member 1320. The valve port 1131 and the bypass port 1133 are in fluid communication with the cavity 1306 via the first conduit 1329 in the example illustrated.

Referring to FIG. 9B, in the example illustrated, the valve housing 1372 includes a housing outer surface 1400 in engagement with a conduit inner surface of the first conduit 1329. This engagement inhibits air flow past an outer diameter of the valve housing 1372 and an inner diameter of the first conduit 1329.

Referring to FIG. 11A, another example of a cooling plate assembly 2120 for use with the take-out device 114 and/or the supplementary cooling device 118 is illustrated. The plate assembly 2120 has similarities to the cooling plate assembly 1120, and like features are identified by like reference characters, incremented by 1000.

Referring to FIG. 11A, in the example illustrated, the cooling plate assembly 2120 includes a valve 2130 within an assembly bore 2410 for regulating air flow between an air channel of a cooling plate 2200 and a cavity of a cooling tube 2300. The valve 2130 is movable between a first position (FIG. 11A) and a second position (FIG. 11B).

Referring to FIG. 11A, when the valve 2130 is in the first position, a first air flow passage 2332*a* extending within an assembly bore 2410 is open for conducting air from the cavity to the air channel. Referring to FIG. 11B, when the valve 2130 is in the second position, the first air flow passage 2332*a* is obstructed to reduce air flow between the air channel and the cavity relative to the first position, and a second air flow passage 2332*b* extending within the assembly bore 2410 is open for conducting air from the air channel to the cavity.

In the example illustrated, the valve 2130 includes a closure member 2330, a valve seat 2336, a valve chamber 2342, and a valve housing 2372. The valve 2130 includes a valve port 2131 and a bypass port 2133. The first air flow passage 2332*a* comprises the valve port 2131 and the second air flow passage 2332*b* comprises the bypass port 2133. In the example illustrated, the valve port 2131 comprises a first front port 2374 in a front wall 2386 of the valve housing 2372.

In the example illustrated, the valve 2130 further includes an ejector member 2320 having an internal first conduit 2329. The valve housing 2372 is retained within the first conduit 2329 and fixed relative to the ejector member 2320.

Referring to FIGS. 11A and 11B, in the example illustrated, some air flow is permitted between the outer surface 2400 of the valve housing 2372 and the inner surface of the first conduit 2329 via a bypass flow channel 2416. The bypass port 2133 comprises the bypass flow channel 2416 in the example illustrated. The bypass flow channel 2416 is bounded radially at least in part by the outer surface of the valve housing 2372. Referring to FIG. 12, in the example illustrated, material is removed at discrete locations on the outer surface of the valve housing 2372 to provide the bypass flow channel 2416. The bypass flow channel 2416 is in fluid communication with the cooling tube cavity via the first conduit 2329.

Figure 13A:
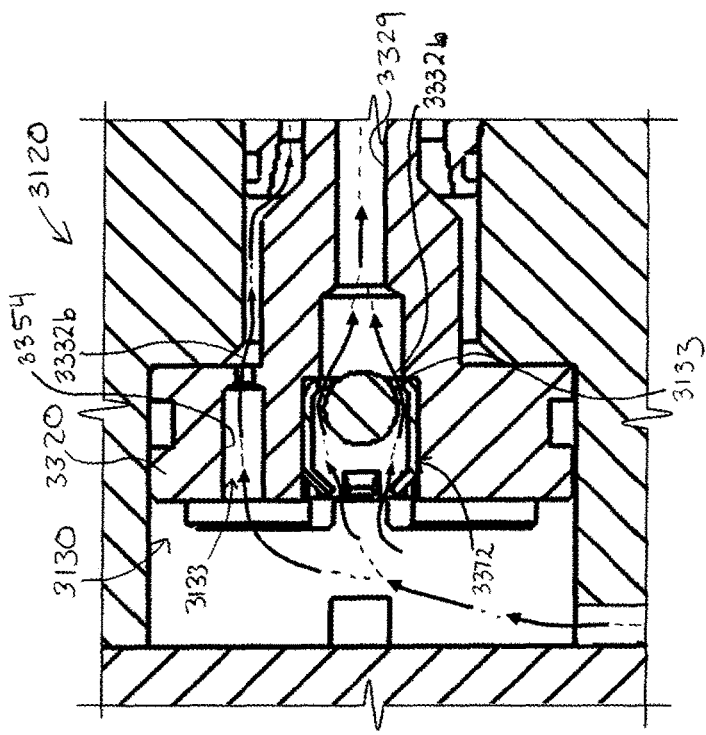
FIG. 13A is a cross-sectional view of a portion of an alternative cooling plate assembly for a machine like that of FIG. 1, shown in a first condition.

Referring to FIG. 13A, another example of a cooling plate assembly 3120 for use with the take-out device 114 and/or the supplementary cooling device 118 is illustrated. The plate assembly 3120 has similarities to the cooling plate assembly 1120, and like features are identified by like reference characters, incremented by 2000.

Figure 13B:
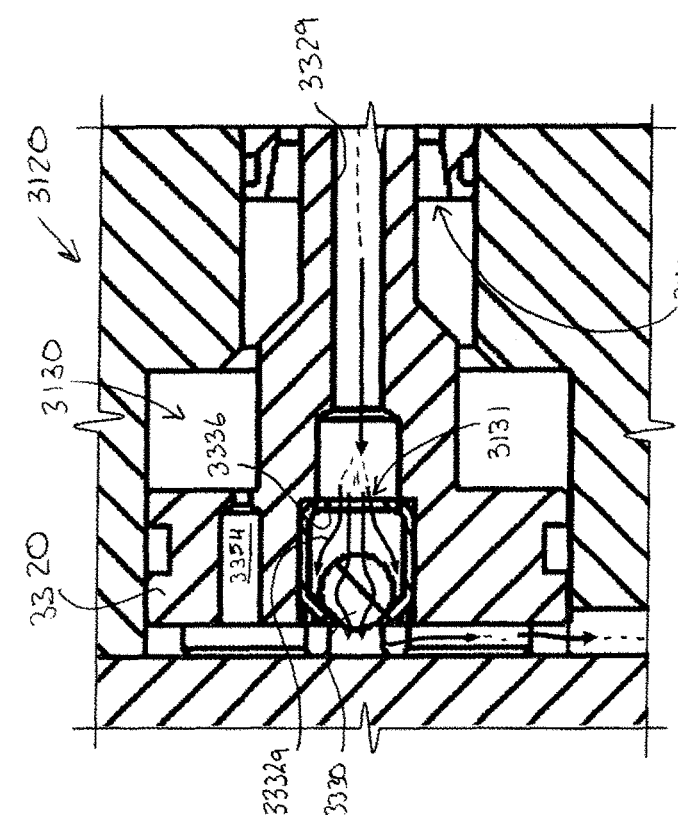
FIG. 13B is a cross-sectional view like that of FIG. 13A, showing portions of the plate assembly of FIG. 13A in a second condition.
Figure 14:
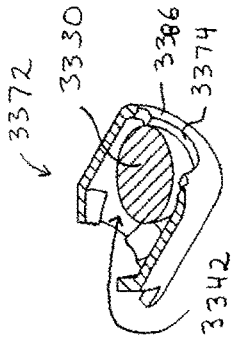
FIG. 14 is a front perspective view of valve portions of the plate assembly of FIG. 13A.
Figure 14A:
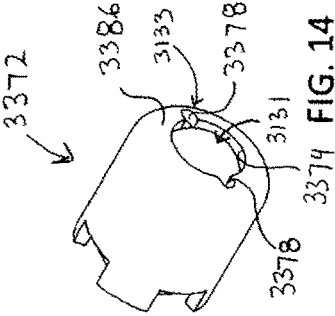
FIG. 14A is a partial cut-away, front perspective view of the valve portions of FIG. 14.

Referring to FIG. 13A, in the example illustrated, the cooling plate assembly 3120 includes a valve 3130 within an assembly bore 3410 for regulating air flow between an air channel of a cooling plate 3200 and a cavity of a cooling tube 3300. The valve 3130 is movable between a first position (FIG. 13A) and a second position (FIG. 13B). When the valve 3130 is in the first position, a first air flow passage 3332*a* extending within the assembly bore 3410 is open for conducting air from the cavity to the air channel. When the valve 3130 is in the second position, the first air flow passage 3332*a* is obstructed to reduce air flow between the air channel and the cavity relative to the first position, and a second air flow passage 3332*b* extending within the assembly bore 3410 is open for conducting air from the air channel to the cavity.

In the example illustrated, the valve 3130 includes a closure member 3330, a valve seat 3336, a valve chamber 3342, and a valve housing 3372. The valve housing 3372 is of one-piece construction in the example illustrated.

In the example illustrated, the valve 3130 includes a valve port 3131 and a bypass port 3133. The first air flow passage 3332*a* comprises the valve port 3131 and the second air flow passage 3332*b* comprises the bypass port 3133. In the example illustrated, the valve port 3131 comprises a first front port 3374 in a front wall 3386 of the valve housing 3372, and the bypass port 3133 comprises a second front port 3378 in the front wall 3386 of the valve housing 3372.

In the example illustrated, the valve 3130 further includes an ejector member 3320 having an internal first conduit 3329. The valve housing 3372 is retained within the first conduit 3329 and fixed relative to the ejector member 3320. The ejector member 3320 includes an internal second conduit 3354 in the example illustrated. The bypass port 3133 further comprises the second conduit 3354 in the example illustrated.

Referring to FIG. 15A, another example of a cooling plate assembly 4120 for use with the take-out device 114 and/or the supplementary cooling device 118 is illustrated. The cooling plate assembly 4120 has similarities to the cooling plate assembly 1120, and like features are identified by like reference characters, incremented by 3000.

The cooling plate assembly 4120 provides an example of an embodiment having features similar to those of the cooling plate assembly 1120, but without the optional ejector member. In some cases (e.g., for some preform geometries), the ejector member may not be required, and urging pressurized air into the cavity may be sufficient to eject certain types of preforms. Omitting the ejector member in such cases can provide a simplified and more cost-effective cooling plate assembly.

In the example illustrated, the plate assembly 4120 includes a cooling plate 4200, an air channel 4202 extending within a thickness 4207 of the cooling plate 4200, a coolant channel 4204 extending within the thickness 4207, a cooling tube 4300 mounted to the cooling plate 4200, and an assembly bore 4410 for providing fluid communication between the air channel 4202 and a cavity 4306 of the cooling tube 4300. The assembly bore 4410 comprises a plate bore 4210 and a tube bore 4310.

Figure 16B:
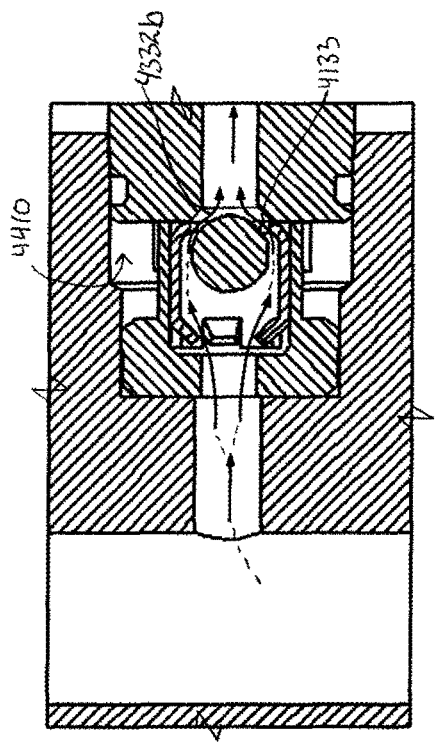
FIG. 16B is an enlarged view of a portion of FIG. 15B.
Figure 16A:
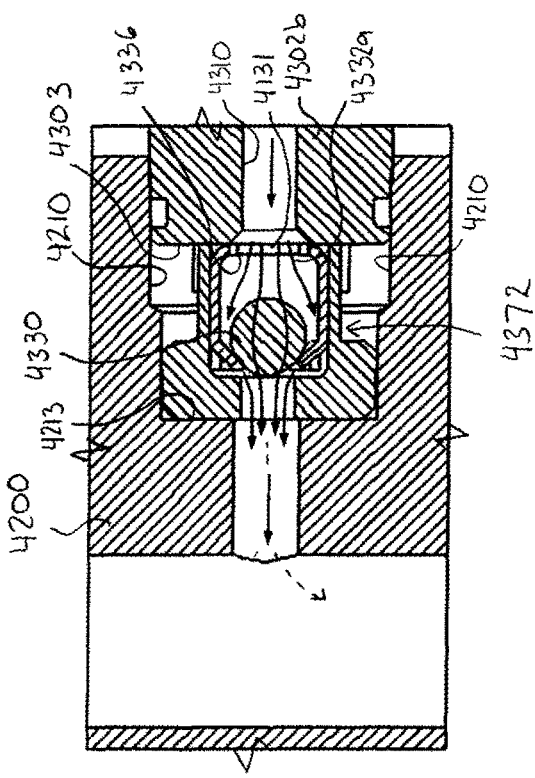
FIG. 16A is an enlarged view of a portion of FIG. 15A.

In the example illustrated, the plate assembly 4120 includes a valve 4130 within the assembly bore 4410 for regulating air flow between the air channel 4202 and the cavity 4306. The valve 4130 is movable between a first position (FIG. 16A) and a second position (FIG. 16B). Referring to FIG. 16A, when the valve 4130 is in the first position, a first air flow passage 4332*a* extending within the assembly bore 4410 is open for conducting air from the cavity 4306 to the air channel 4202 to draw a preform 4110 into the cavity 4306.

Referring to FIG. 16B, when the valve 4130 is in the second position, the first air flow passage 4332*a* is obstructed to reduce air flow between the air channel 4202 and the cavity 4306 relative to the first position. When the valve 4130 is in the second position, a second air flow passage 4332*b* extending within the assembly bore 4410 is open for conducting air from the air channel 4202 to the cavity 4306 to assist ejection of the preform 4110 from the cavity 4306.

In the example illustrated, the valve 4130 includes a closure member 4330, a valve seat 4336, a valve chamber 4342, and a valve housing 4372. The valve housing 4372 is of two-piece construction in the example illustrated. Referring to FIG. 16A, in the example illustrated, the valve housing 4372 (and the valve seat 4336) is fixed relative to the cooling plate 4200. The valve housing 4372 is retained within the plate bore 4210 between an axial endface 4303 of a spigot portion 4302*b* of the cooling tube 4300, and an axially spaced apart stepped surface 4213 of the plate bore 4210. The valve housing 4372 is press fit within the plate bore 4210 in the example illustrated.

Figure 17A:
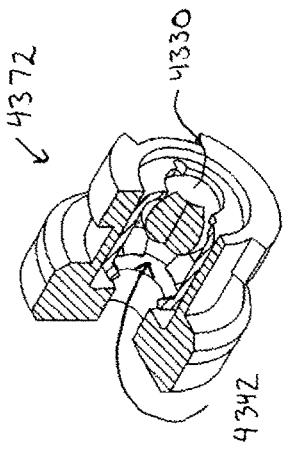
FIG. 17A is a partial cut-away, front perspective view of the valve portions of FIG. 17.
Figure 17:
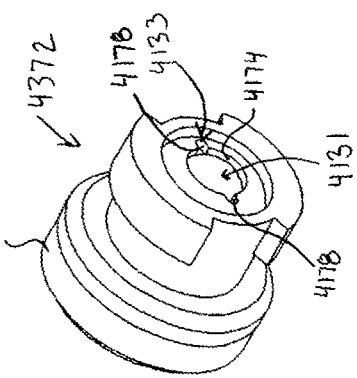
FIG. 17 is a front perspective view of valve portions of the plate assembly of FIG. 15A.
Figure 18B:
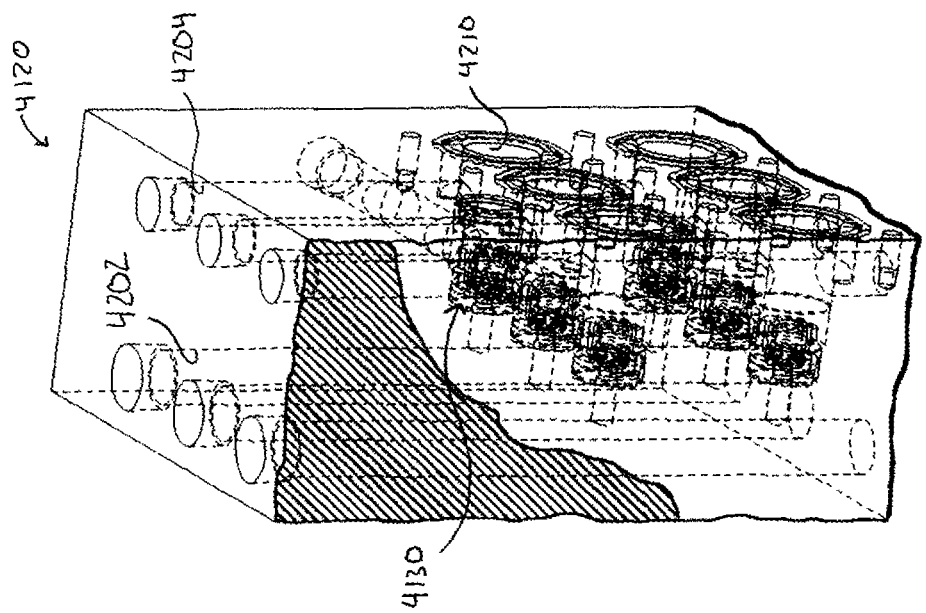
FIG. 18B is another perspective view of the portion of the cooling plate assembly of FIG. 18A.
Figure 18A:
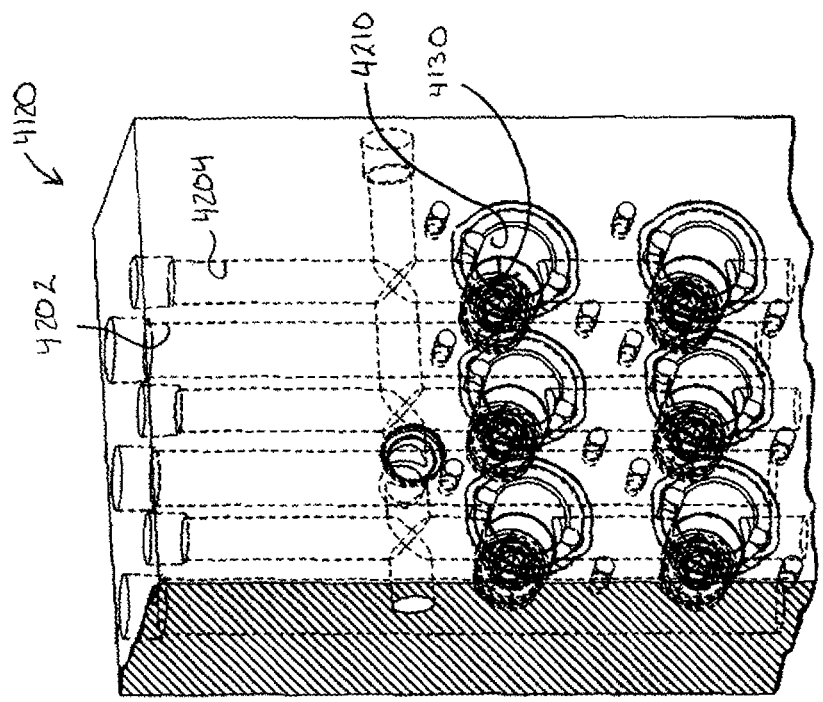
FIG. 18A is a front perspective view of a portion of the cooling plate assembly of FIG. 15A.

In the example illustrated, the valve 4130 includes a valve port 4131 and a bypass port 4133. The first air flow passage 4332*a* comprises the valve port 4131 and the second air flow passage 4332*b* comprises the bypass port 4133. Referring to FIG. 17, in the example illustrated, the valve port 4131 comprises a first front port 4374 in a front wall 4386 of the valve housing 4372, and the bypass port 4133 comprises a second front port 4378 in the front wall 4386 of the valve housing 4372.

In the example illustrated, the valve housing 4372 includes a housing outer surface 4400 in engagement with a bore inner surface of the plate bore 4210. This engagement inhibits air flow past an outer diameter of the valve housing 4372 and an inner diameter of the plate bore 4210.

Figure 19A:
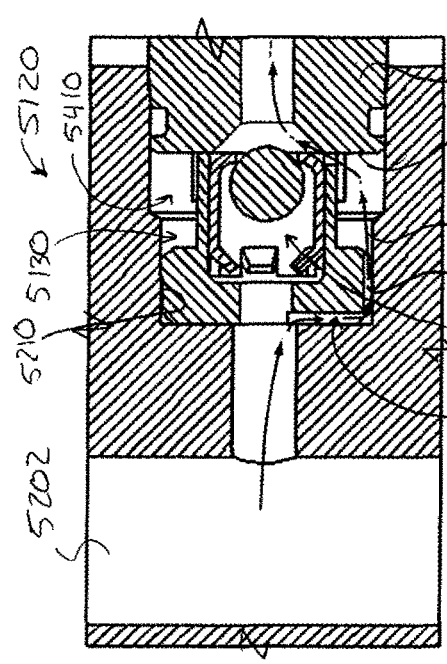
FIG. 19A is a cross-sectional view of a portion of an alternative cooling plate assembly for a machine like that of FIG. 1, shown in a first condition.

Referring to FIG. 19A, another example of a cooling plate assembly 5120 for use with the take-out device 114 and/or the supplementary cooling device 118 is illustrated. The cooling plate assembly 5120 has similarities to the cooling plate assembly 4120, and like features are identified by like reference characters, incremented by 1000.

Referring to FIG. 19A, in the example illustrated, the cooling plate assembly 5120 includes a valve 5130 within an assembly bore 5410 for regulating air flow between an air channel 5202 of a cooling plate 5200 and a cavity of a cooling tube. The valve 5130 is movable between a first position (FIG. 19A) and a second position (FIG. 19B).

Referring to FIG. 19A, when the valve 5130 is in the first position, a first air flow passage 5332*a* extending within the assembly bore 5410 is open for conducting air from the cavity to the air channel 5202.

Figure 19B:
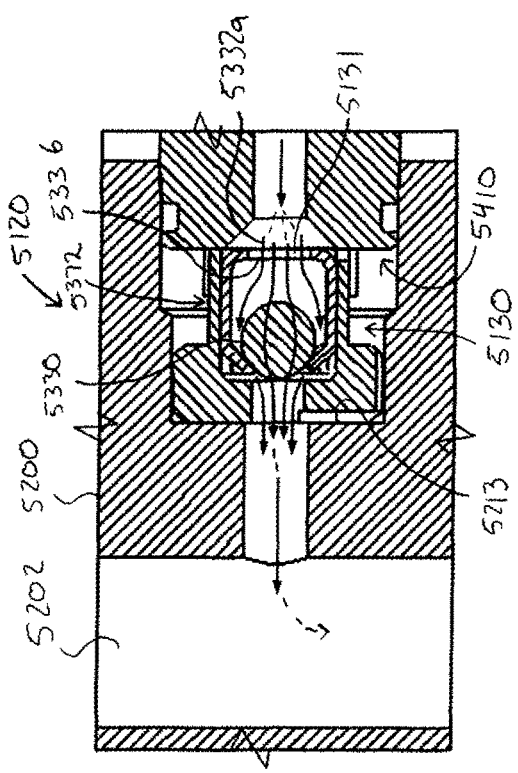
FIG. 19B is a cross-sectional view like that of FIG. 19A, showing portions of the plate assembly of FIG. 19A in a second condition.

Referring to FIG. 19B, when the valve 5130 is in the second position, the first air flow passage 5332*a* is obstructed to reduce air flow between the air channel 5202 and the cavity relative to the first position, and a second air flow passage 5332*b* extending within the assembly bore 5410 is open for conducting air from the air channel 5202 to the cavity.

In the example illustrated, the valve 5130 includes a closure member 5330, a valve seat 5336, a valve chamber 5342, and a valve housing 5372. The valve housing 5372 is of two-piece construction in the example illustrated. In the example illustrated, the valve housing 5372 (and the valve seat 5336) is fixed relative to the cooling plate 5200. The valve housing 5372 is retained within the plate bore 5210 between an axial endface 5303 of a spigot portion 5302*b* of the cooling tube, and an axially spaced apart stepped surface 5213 of the plate bore 5210. The valve housing 5372 is press fit within the plate bore 5210 in the example illustrated.

Referring to FIGS. 19A and 19B, in the example illustrated, the valve 5130 includes a valve port 5131 and a bypass port 5133. The first air flow passage 5332*a* comprises the valve port 5131 and the second air flow passage 5332*b* comprises the bypass port 5133. In the example illustrated, the valve port 5131 comprises a first front port 5374 in a front wall 5386 of the valve housing 4372.

Figure 20:
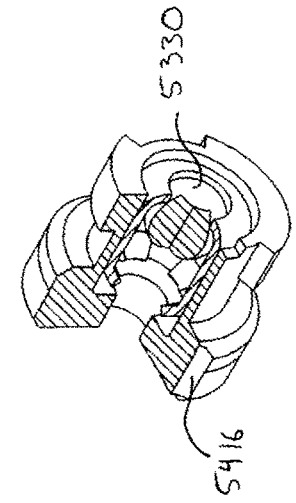
FIG. 20 is a front perspective view of valve portions of the plate assembly of FIG. 19A.
Figure 20A:
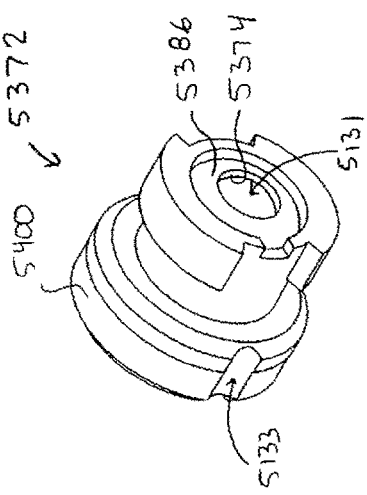
FIG. 20A is a partial cut-away, front perspective view of the valve portions of FIG. 20.

Referring to FIG. 19B, in the example illustrated, some air flow is permitted between the outer surface 5400 of the valve housing 5372 and the bore inner surface of the plate bore 5210 via a bypass flow channel 5416. The bypass port 5133 comprises the bypass flow channel 5416 in the example illustrated. The bypass flow channel 5416 is bounded radially at least in part by the outer surface of the valve housing 5372. Referring to FIG. 20, in the example illustrated, material is removed at discrete locations on the outer surface of the valve housing 5372 to provide the bypass flow channel 5416.

Referring to FIG. 21A, another example of a cooling plate assembly 6120 for use with the take-out device 114 and/or the supplementary cooling device 118 is illustrated. The cooling plate assembly 6120 has similarities to the cooling plate assembly 120, and like features are identified by like reference characters, incremented by 6000.

In the example illustrated, the cooling plate assembly 6120 includes a cooling plate 6200 and a cooling tube 6300 mounted to the cooling plate 6200. The cooling plate 6200 includes an air channel 6202 extending within a thickness of the plate 6200, and an assembly bore 6410 for providing fluid communication between the air channel 6202 and a cavity 6306 of the cooling tube 6300. The assembly bore 6410 comprises a plate bore 6210 and a tube bore 6310.

In the example illustrated, the plate assembly 6120 includes a valve 6130 retained within the tube bore 6310 for regulating air flow between an air channel 6202 and the cavity 6306. The valve 6130 is movable between a first position (FIG. 21A) and a second position (FIG. 21B).

Figure 22A:
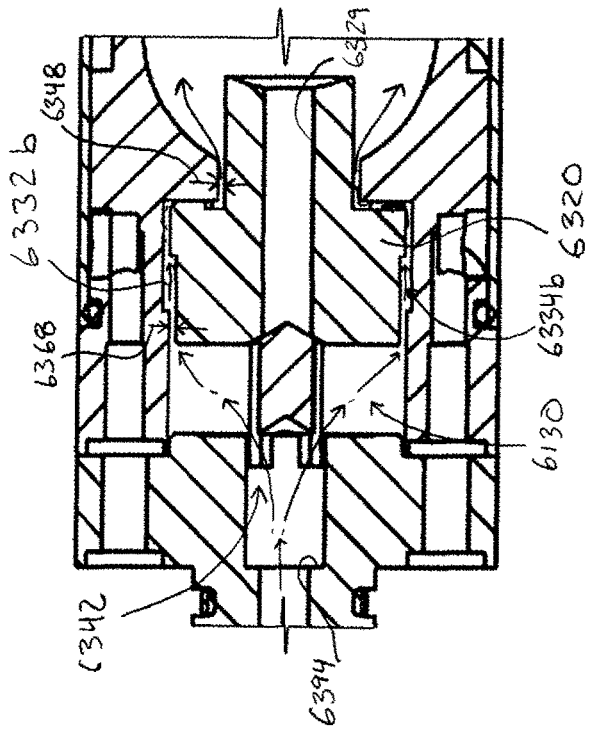
FIG. 22A is an enlarged view of a portion of the plate assembly of FIG. 21A.
Figure 23A:
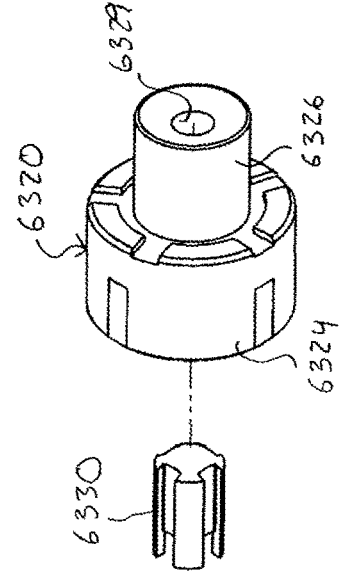
FIG. 23A is a rear perspective view of valve portions of the plate assembly of FIG. 21A.

Referring to FIG. 22A, when the valve 6130 is in the first position, a first air flow passage 6332*a* extending within the assembly bore 6410 is open for conducting air from the cavity 6306 to the air channel 6202.

Figure 22B:
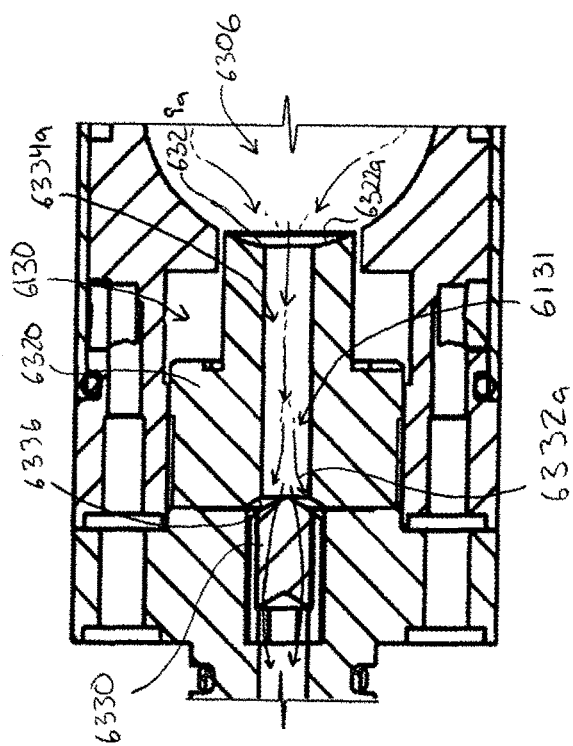
FIG. 22B is an enlarged view of a portion of the plate assembly of FIG. 21B.
Figure 23B:
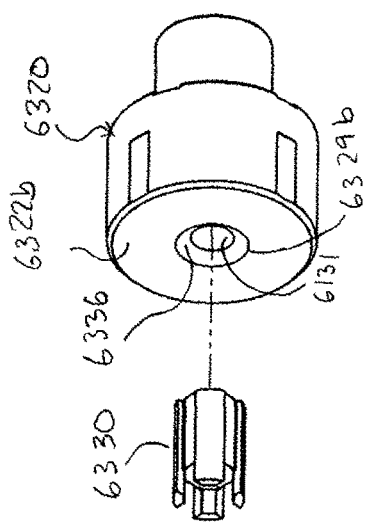
FIG. 23B is a front perspective view of the valve portions of FIG. 23A.

Referring to FIG. 22B, when the valve 6130 is in the second position, the first air flow passage 6332*a* is obstructed to reduce air flow between the air channel 6202 and the cavity 6306 relative to the first position, and a second air flow passage 6332*b* extending within the assembly bore 6410 is open for conducting air from the air channel 6202 to the cavity 6306.

Referring to FIG. 22A, in the example illustrated, the valve 6130 includes a closure member 6330 and a valve seat 6336 for engagement by the closure member 6330. The closure member 6330 is movable relative to the valve seat between an open position (FIG. 22A) and a closed position (FIG. 22B). In the example illustrated, the closure member 6330 is movably retained within a valve chamber 6342 between the valve seat 6336 and an axially spaced apart retaining surface 6394. In the example illustrated, the valve 6130 includes a valve port 6131 directed toward the cavity 6306. The valve seat 6336 circumscribes at least a portion of the valve port 6131 in the example illustrated. Referring to FIG. 9A, in the example illustrated, the first air flow passage 6332*a* comprises the valve port 6131.

In the example illustrated, the valve 6130 further includes an ejector member 6320 movable relative to the cooling tube 6300 between an ejector retracted position (FIG. 22A) and an ejector advanced position (FIG. 22B). The valve seat 6336 is fixed relative to the ejector member 6320 in the example illustrated.

In the example illustrated, the first air flow passage 6332*a* comprises a first duct 6334*a* extending within the tube bore 6310, and the second air flow passage 6332*b* comprises a second duct 6334*b* extending within the tube bore 6310. The ejector member 6320 separates the tube bore 6310 into the first duct 6334*a* and the second duct 6334*b* in the example illustrated.

In the example illustrated, the ejector member has an internal first conduit 6329. The first duct 6334*a* comprises the first conduit 6329 in the example illustrated. In the example illustrated, the first conduit 6329 extends lengthwise along a first conduit axis between a first conduit first end 6329*a* open to a leading surface 6322*a* of the ejector member 6320, and a first conduit second end 6329*b* open to a trailing surface 6322*b* of the ejector member 6320.

In the example illustrated, the first conduit 6329 has a conduit first axial portion open to the leading surface 6322*a* of the ejector member 6320 and a conduit second axial portion open to the trailing surface 6322*b*. In the example illustrated, the conduit second axial portion has an inner surface portion extending from the first conduit second end 6329*b* to the conduit first axial portion. In the example illustrated, the inner surface portion is generally conical. In the example illustrated, the inner surface portion comprises the valve seat 6336, and the valve port 6131 comprises the conduit first axial portion.

Referring to FIG. 22B, in the example illustrated, at least a portion of the second duct 6334*b* is bounded radially by an outer surface of the ejector member 6320 and an inner surface of the tube bore 6310. The ejector member 6320 includes an ejector piston 6324 and an ejector pin 6326 extending from the ejector piston 6324 toward the cavity 6306. In the example illustrated, an annular gap 6348 is provided between the outer surface of the ejector pin 6326 and the inner surface of the tube bore 6310. The second duct 6334*b* comprises the annular gap 6348. In the example illustrated, material is removed from outer surfaces of the ejector piston 6324. The removed material provides gaps 6368 along the axial length of the ejector piston 6324 between outer surfaces of the ejector piston 6324 and inner surfaces of the tube bore 6310 when the ejector member 6320 is in the ejector advanced position. The second duct 6334*b* comprises the gaps 6348, 6368.

The invention claimed is:

1. A cooling plate assembly for an injection molding machine, the assembly comprising:
   a) a cooling plate having a plate front surface;
   b) an air channel extending within a thickness of the cooling plate generally parallel to the plate front surface;
   c) a plate bore extending into the cooling plate from the plate front surface, the plate bore extending lengthwise along a plate bore axis between a plate bore first end open to the plate front surface and a plate bore second end in fluid communication with the air channel, the plate bore for providing fluid communication between the air channel and a cavity of a cooling tube mountable to the cooling plate, the cavity for receiving at least a portion of a molded article; and
   d) a valve within the plate bore for regulating air flow between the air channel and the cavity, the valve movable between a first position in which a first air flow passage extending within the plate bore is open for conducting air from the cavity to the air channel to draw the molded article into the cavity, and a second position in which the first air flow passage is obstructed to reduce air flow between the cavity and the air channel, and in which a second air flow passage extending within the plate bore is open for conducting air from the air channel to the cavity to assist ejection of the molded article from the cavity.

2. The assembly of claim 1, wherein the valve comprises a valve seat and a closure member movable relative to the valve seat, and wherein when the valve is in the first position, the closure member is spaced apart from the valve seat and an air flow gap is provided between the valve seat and a sealing surface of the closure member, the first air flow passage comprising the air flow gap, and when the valve is in the second position, the sealing surface is in engagement with the valve seat and the air flow gap is closed.

3. The assembly of claim 2, wherein the first air flow passage comprises a valve port directed toward the cavity, the valve seat circumscribing at least a portion of the valve port, and wherein when the valve is in the first position, the valve port is unblocked, and when the valve is in the second position, the closure member blocks the valve port.

4. The assembly of claim 3, wherein the second air flow passage comprises a bypass port directed toward the cavity, and wherein when the valve is in the second position, the bypass port is unblocked.

5. The assembly of claim 4, wherein the valve includes an ejector member slidably seated within the plate bore and movable between an ejector retracted position for accommodating receipt of the portion of the molded article within the cavity and an ejector advanced position for assisting ejection of the molded article from the cavity, and wherein the valve seat is fixed relative to the ejector member.

6. The assembly of claim 5, wherein the ejector member is in the retracted position when the valve is in the first position, and the ejector member is in the advanced position when the valve is in the second position.

7. The assembly of claim 5, wherein the ejector member comprises a leading surface for bearing against the molded article when the ejector member moves toward the ejector advanced position, an axially opposed trailing surface directed toward the plate bore second end, and an internal first conduit extending between a first conduit first end open to the leading surface for fluid communication with the cavity and a first conduit second end open to the trailing surface for fluid communication with the air channel, and wherein the valve port comprises an axial portion of the first conduit.

8. The assembly of claim 7, wherein the ejector member comprises an internal second conduit, the second conduit extending generally parallel to and laterally offset from the first conduit, and wherein the bypass port comprises the second conduit.

9. The assembly of claim 8, wherein the ejector member comprises a piston in close sliding fit with an inner diameter of the plate bore, and wherein the second conduit extends axially through the piston.

10. The assembly of claim 5, wherein the second air flow passage comprises a duct bounded radially by an outer surface of the ejector member and an inner surface of the plate bore.

11. The assembly of claim 1, wherein drawing air from the plate bore into the air channel urges the valve toward the first position and conducting pressurized air from the air channel Into the plate bore urges the valve toward the second position.

12. A cooling plate assembly for an injection molding machine, the assembly comprising:
  a) a cooling plate having a plate front surface;
  b) an air channel extending within a thickness of the cooling plate generally parallel to the plate front surface;
  c) a plate bore extending into the cooling plate from the plate front surface, the plate bore extending lengthwise along a plate bore axis between a plate bore first end open to the plate front surface and a plate bore second end in fluid communication with the air channel, the plate bore for providing fluid communication between the air channel and a cavity of a cooling tube mountable to the cooling plate, the cavity for receiving at least a portion of a molded article; and
  d) a valve within the plate bore for regulating air flow between the air channel and the cavity, the valve movable between a first position in which a first air flow passage extending within the plate bore is open for conducting air from the cavity to the air channel to draw the molded article into the cavity, and a second position in which the first air flow passage is obstructed to reduce air flow between the cavity and the air channel, and in which a second air flow passage extending within the plate bore is open for conducting air from the air channel to the cavity to assist election of the molded article from the cavity,
    wherein the valve comprises a valve seat and a closure member movable relative to the valve seat, and wherein when the valve is in the first position, the closure member is spaced apart from the valve seat and an air flow gap is provided between the valve seat and a sealing surface of the closure member, the first air flow passage comprising the air flow gap, and when the valve is in the second position, the sealing surface is in engagement with the valve seat and the air flow gap is closed,
    wherein the first air flow passage comprises a valve port directed toward the cavity, the valve seat circumscribing at least a portion of the valve port and wherein when the valve is in the first position, the valve port is unblocked, and when the valve is in the second position, the closure member blocks the valve port,
    wherein the second air flow passage comprises a bypass port directed toward the cavity, and wherein when the valve is in the second position, the bypass port is unblocked, and
    and wherein the valve comprises a valve housing having a hollow interior defining a valve chamber, the closure member movably retained within the valve chamber, and wherein the valve housing has a front wall axially bounding the valve chamber and a first front port in the front wall, the valve port comprising the first front port.

13. The assembly of claim 12, wherein the valve housing further includes a second front port in the front wall, and the bypass port comprises the second front port.

14. The assembly of claim 13, wherein the second front port laterally adjoins the first front port.

15. The assembly of claim 12, wherein the bypass port comprises a bypass flow channel bounded radially in part by an outer surface of the valve housing.

16. The assembly of claim 15, wherein the bypass flow channel is bounded radially by the outer surface of the valve housing and an inner surface of the plate bore.

17. The assembly of claim 12, wherein the valve housing is fixed relative to the cooling plate.

18. A cooling plate assembly for an injection molding machine, the assembly comprising:
  a) a cooling plate having a plate front surface;
  b) an air channel extending within a thickness of the cooling plate generally parallel to the plate front surface;
  c) a cooling tube mounted to the cooling plate, the cooling tube having a cavity for receiving at least a portion of a molded article;
  d) an assembly bore extending through the cooling tube and into the cooling plate from the plate front surface, the assembly bore extending lengthwise along an assembly bore axis between an assembly bore first end open to the cavity and an assembly bore second end in fluid communication with the air channel, the assembly bore for providing fluid communication between the air channel and the cavity; and
  e) a valve within the assembly bore for regulating air flow between the air channel and the cavity, the valve movable between a first position in which a first air flow passage extending within the assembly bore is open for conducting air from the cavity to the air channel to draw the molded article into the cavity, and a second position in which the first air flow passage is obstructed to reduce air flow between the cavity and the air channel, and in which a second air flow passage extending within the assembly bore is open from the assembly bore second end to the assembly bore first end for conducting air from the air channel to the cavity to assist ejection of the molded article from the cavity.

19. The assembly of claim 18, wherein the assembly bore comprises a plate bore extending into the cooling plate from the plate front surface to the air channel, and a tube bore extending between the plate bore and the cavity, wherein the valve is within the plate bore.

20. The assembly of claim 18, wherein the valve comprises a valve housing having a hollow interior defining a valve chamber, a closure member movably retained within the valve chamber, and wherein the valve housing has a front wall axially bounding the valve chamber and a first front port in the front wall, the first air flow passage comprising the first front port, and wherein when the valve is in the first position the closure member is spaced apart from the front wall and an air flow gap is provided between a sealing surface of the closure member and the front wall, and wherein when the valve is in the second position the sealing surface of the closure member is in engagement with the front wall and the air flow gap is closed.

21. A cooling plate assembly for an injection molding machine, the assembly comprising:
   a) a cooling plate having a plate front surface;
   b) an air channel extending within a thickness of the cooling plate generally parallel to the plate front surface;
   c) a cooling tube mounted to the cooling plate, the cooling tube having a cavity for receiving at least a portion of a molded article;
   d) an assembly bore extending through the cooling tube and into the cooling plate from the plate front surface, the assembly bore extending lengthwise along an assembly bore axis between an assembly bore first end open to the cavity and an assembly bore second end in fluid communication with the air channel;
   e) an ejector member slidably mounted within the assembly bore, the ejector member movable relative to the cavity between an ejector retracted position for accommodating receipt of the portion of the molded article in the cavity and an ejector advanced position for assisting ejection of the molded article from the cavity; and
   f) a closure member within the assembly bore, the closure member movable relative to a valve seat, the valve seat fixed to the ejector member, the closure member movable between an open position and a closed position, wherein when in the open position the closure member is spaced apart from the valve seat and an air flow gap is provided between the closure member and the valve seat for conducting air from the cavity to the air channel to draw the molded article into the cavity, and when in the closed position the closure member is in engagement with the valve seat and the air flow gap is closed for reducing air flow between the air channel and the cavity relative to the open position.

22. The assembly of claim 21, wherein the ejector member comprises a leading end directed toward the cavity and a piston member fixed relative to the leading end, the piston member disposed axially intermediate the leading end and the air channel and the piston member in sealed sliding engagement with an inner surface of the assembly bore, the ejector axially slidable between a retracted position in which the leading end is generally flush with an inner surface of the cavity, and an advanced position in which the leading end projects into the cavity for ejecting the molded article.

23. The assembly of claim 22, further comprising an internal conduit extending through the ejector between a first conduit end open to the cavity via an aperture in the leading end of the ejector, and a second conduit end open to the air channel.

24. The assembly of claim 23, further comprising a valve housing within the ejector and having a hollow interior defining a valve chamber in fluid communication with the internal conduit, the valve chamber containing the closure member and bounded partially by the valve seat, and wherein when the closure member is moved to the open position, a first air flow passage comprising the air flow gap is open through the internal conduit for drawing air from the cavity to the air channel when loading the molded article into the cavity, and wherein when in the closure member is in the closed position:
   (i) the first air flow passage is obstructed to facilitate pressurization of air delivered from the air channel behind the piston to urge the ejector to the advanced position during initial ejection of the molded article, and
   (ii) a second air flow passage extending through the internal conduit is open to deliver pressurized air from the air channel to the cavity during further ejection of the molded article.

* * * * *